United States Patent [19]
Yamaoka et al.

[11] Patent Number: 5,398,184
[45] Date of Patent: Mar. 14, 1995

[54] APPARATUS FOR CONTROLLING DAMPING COEFFICIENT OF VEHICULAR SHOCK ABSORBER

[75] Inventors: Fumiyuki Yamaoka; Toru Takahashi; Shinobu Kakizaki; Junichi Emura; Mitsuo Sasaki; Makoto Kimura, all of Kanagawa, Japan

[73] Assignee: Atsugi Unisia Corp., Japan

[21] Appl. No.: 968,496

[22] Filed: Oct. 29, 1992

[30] Foreign Application Priority Data

| Nov. 1, 1991 | [JP] | Japan | 3-287877 |
| Dec. 13, 1991 | [JP] | Japan | 3-330744 |
| Dec. 13, 1991 | [JP] | Japan | 3-330887 |
| Dec. 27, 1991 | [JP] | Japan | 3-345708 |

[51] Int. Cl.$^6$ .................. B60G 17/015; B60G 21/06
[52] U.S. Cl. ................ 364/424.05; 280/707; 280/703
[58] Field of Search ........ 364/424.05, 426.01, 364/426.02, 426.03, 426.04; 280/707, 703, 688, 735; 188/260

[56] References Cited

U.S. PATENT DOCUMENTS

| 4,696,489 | 9/1987 | Fujishiro et al. | 280/707 |
| 4,888,696 | 12/1989 | Akatsu et al. | 364/424.05 |
| 4,970,645 | 11/1990 | Adachi et al. | 364/424.05 |
| 5,089,966 | 2/1992 | Fukushima et al. | 364/424.05 |
| 5,175,687 | 12/1992 | Tsutsumi et al. | 364/424.05 |
| 5,189,614 | 2/1993 | Mitsuoka et al. | 364/424.05 |
| 5,189,615 | 2/1993 | Rubel et al. | 364/424.05 |
| 5,193,844 | 3/1993 | Butsuen et al. | 280/707 |
| 5,193,845 | 3/1993 | Yokote et al. | 280/707 |

FOREIGN PATENT DOCUMENTS

| 1485003 | 8/1974 | European Pat. Off. . |
| 0306004 | 2/1990 | European Pat. Off. . |
| 0416560 | 3/1991 | European Pat. Off. . |
| 0431597 | 6/1991 | European Pat. Off. . |
| 3907870 | 9/1989 | Germany . |
| 4039629 | 6/1992 | Germany . |
| 4117897 | 12/1992 | Germany . |
| 61-163011 | 7/1986 | Japan . |
| 63-112914 | 7/1988 | Japan . |
| 2215287 | 9/1989 | United Kingdom . |

OTHER PUBLICATIONS

Search Report.
European Search Report.

Primary Examiner—Kevin J. Teska
Assistant Examiner—Tan Nguyen
Attorney, Agent, or Firm—Ronald P. Kananen

[57] ABSTRACT

An apparatus for controlling the damping coefficient of shock absorbers which are associated with the road wheels of the vehicle, produces control signals using one or more of a bouncing rate, a pitching rate and a rolling rate value which is filtered out of a plurality of outputs provided by a plurality of acceleration sensors which are each located in proximity of a shock absorber. The control signal can be modified using the outputs of weight sensors which are used to derive the relative velocities of the road wheels with respect to the vehicle body.

43 Claims, 22 Drawing Sheets

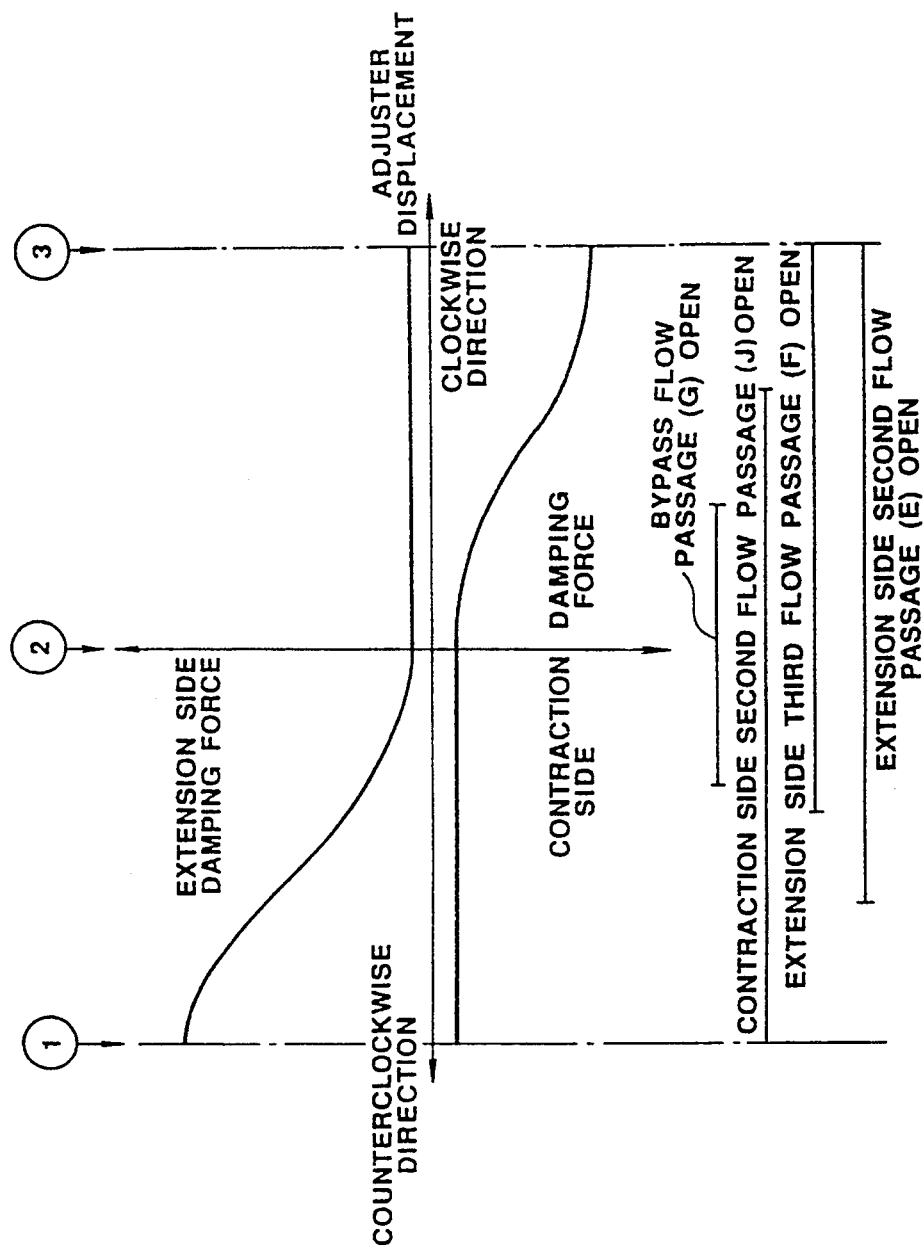

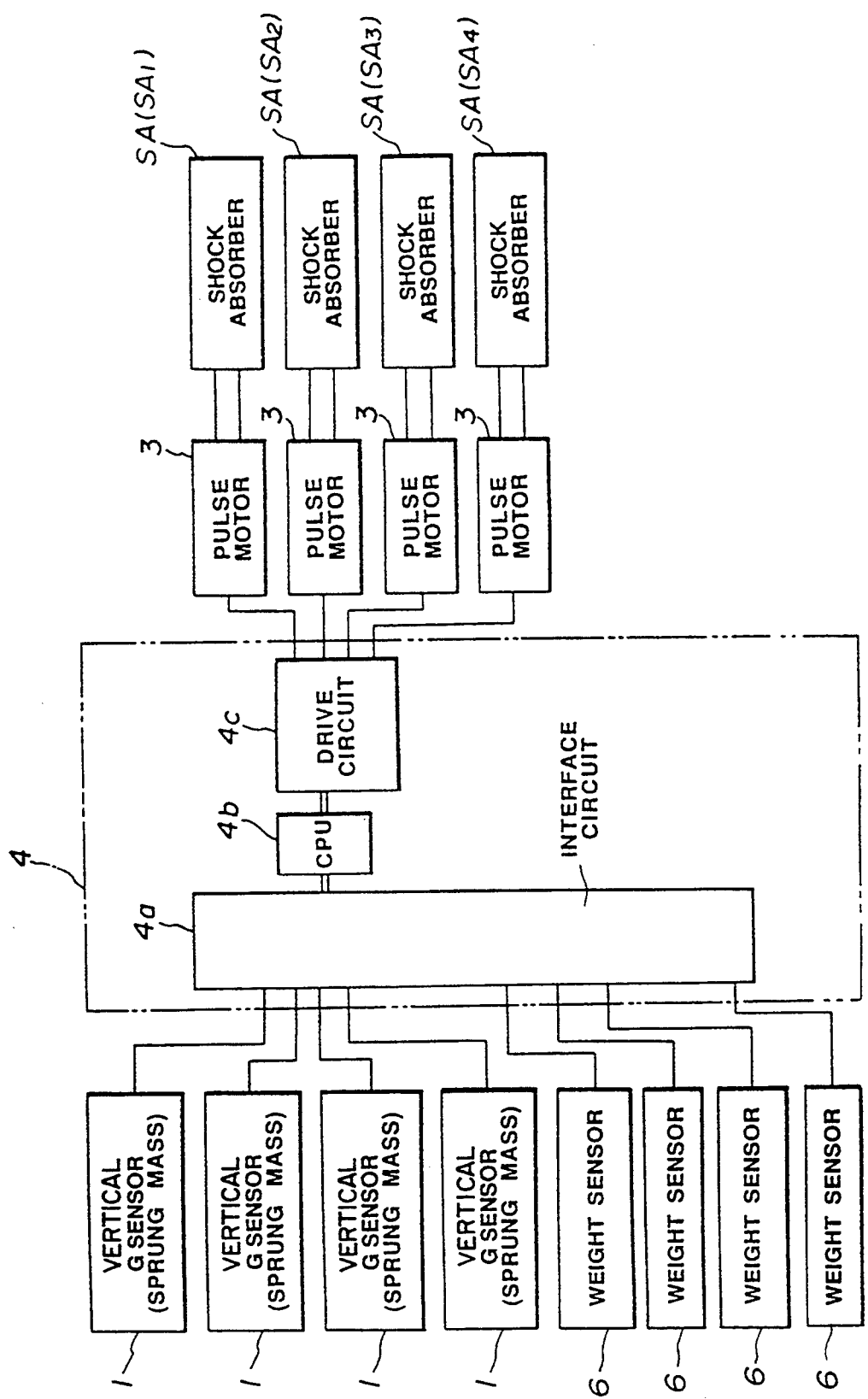

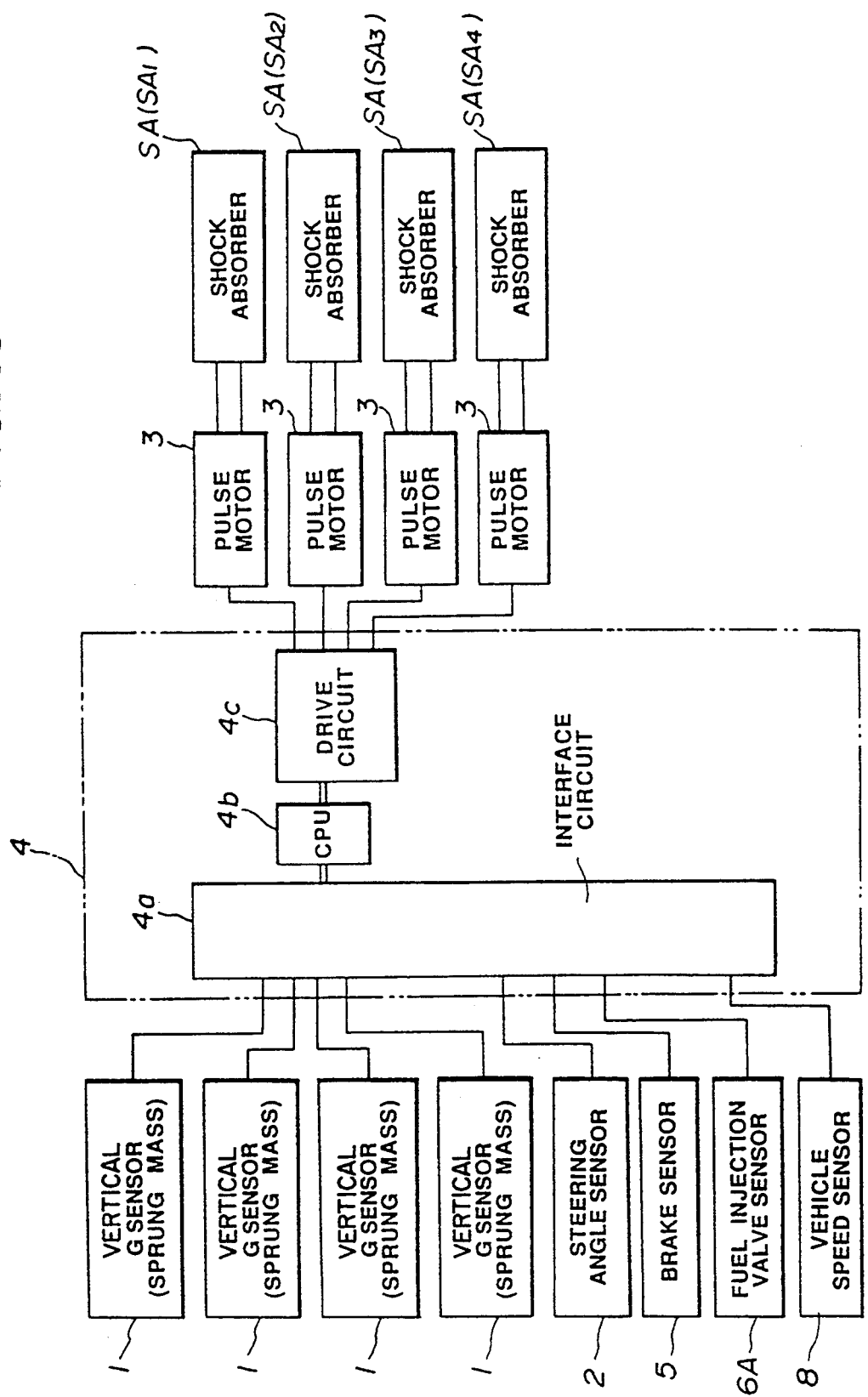

FIG.26
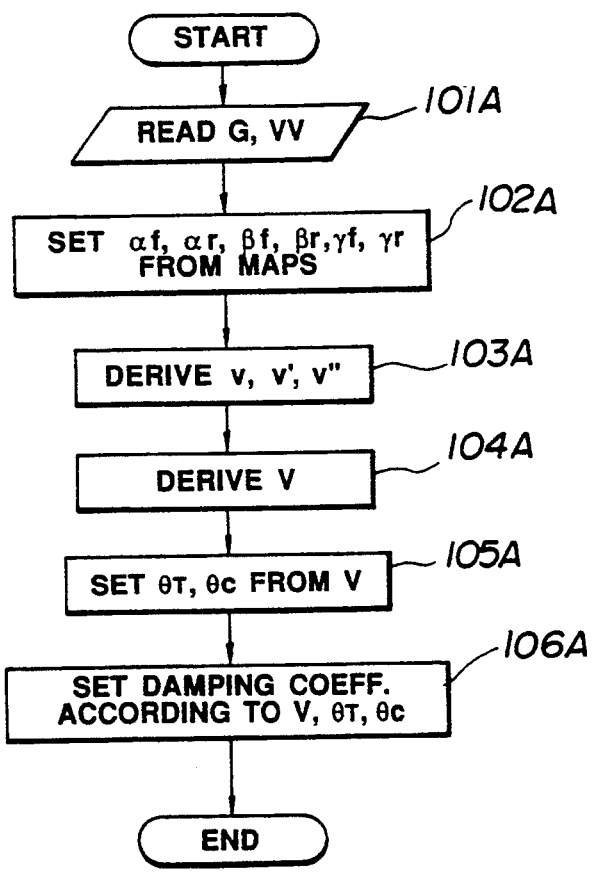
FIG.27(A)    FIG.27(B)
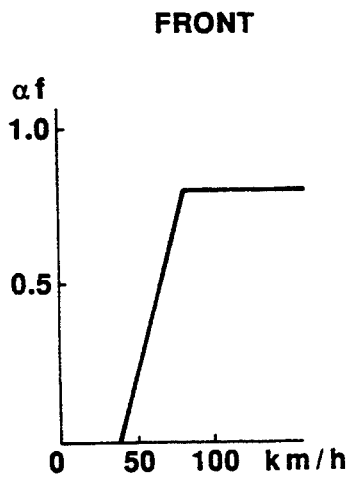
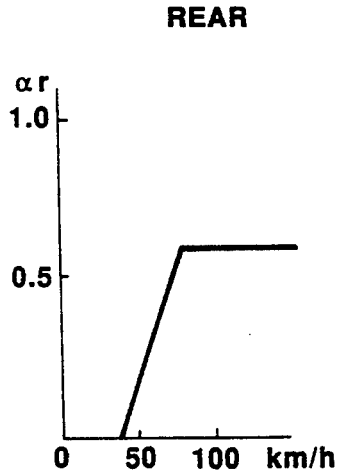

FRONT

REAR

FRONT

REAR

APPARATUS FOR CONTROLLING DAMPING COEFFICIENT OF VEHICULAR SHOCK ABSORBER

BACKGROUND OF THE INVENTION

1. Field of The Invention

The present invention relates to an apparatus for controlling each damping coefficient of four shock absorbers, each shock absorber being interposed between a vehicle body and its respective road wheel, so as to provide an optimum damping force (the shock absorber is also termed damper but hereinafter referred to as shock absorber).

2. Description of The Background Art

A Japanese Patent Application First Publication No. Showa 61-163011 published on Jul. 23, 1986 exemplifies a previously proposed damping coefficient controlling apparatus which detects an sprung mass speed and a relative speed between sprung mass and an unsprung mass speeds. When both of the respective speed values have mutually the same sign (+ or −), the damping coefficients of the respective shock absorbers are in hard positions (in high damping coefficients). When both of them have the mutually different signs (+ or −), the damping coefficients are set to positions of soft damping coefficients. Such a control operation as described above is carried out independently for each shock absorber.

However, in the previously proposed damping coefficient controlling apparatus, in a case where the damping coefficients are optimally set to the hard damping coefficients when the vehicle body is in a bouncing motion, a vehicular body inertia moment with a vehicular weight center as a center is added to the sprung mass in a case where such a bouncing motion as described above is associated with, e.g., a pitching motion of the vehicle body. At this time, the damping force generated in the case where the high damping coefficients are set is insufficient and the steering stability of the vehicle is deteriorated.

In addition, another damping coefficient controlling apparatus has been proposed in which a rolling and/or pitching suppression control toward the suspension system is carried out independently for each other of the shock absorbers.

However, in the latter previously proposed damping coefficient controlling apparatus, another extra sensor such as a steering angle sensor is required and each shock absorber is still independently controlled.

SUMMARY OF THE INVENTION

It is, therefore, a principal object of the present invention to provide an improved apparatus for controlling each damping coefficient of vehicular shock absorbers in which a sufficient damping characteristic for a vehicular inertia moment and a sufficiently high steering stability can be achieved with a simple construction and with a simple control technique.

The above-described object can be achieved by providing an apparatus for controlling each damping coefficient for vehicular shock absorbers, comprising: a) a plurality of shock absorbers, each interposed between a portion of a vehicular body and corresponding tire wheel and each having a piston member defining a fluid upper chamber and a fluid lower chamber and damping coefficient varying means associated with the piston member, said damping coefficient varying means operatively varying its position in response to a control signal so that the damping coefficient at either stroke side of the chambers defined by the piston member is set to a target damping coefficient; b) vertical sprung mass speed detecting means for detecting a longitudinal sprung mass speed of an adjacent position of the vehicular body on which each shock absorber is placed; c) pitching rate detecting means for detecting a pitching rate of the vehicle body; d) rolling rate detecting means for detecting a rolling rate of the vehicle body; and e) controlling means for deriving the control signal for each shock absorber on the basis of at least any one of the vertical sprung mass speed, pitching rate, and rolling rate determined according to a position of each shock absorber located at a corresponding tire wheel and outputting the control signal to each damping coefficient varying means of the corresponding shock absorbers so to provide the target damping coefficient therein.

The above-described object can also be achieved by providing an apparatus for controlling each damping coefficient for vehicular shock absorbers, comprising: a) a plurality of shock absorbers, each interposed between a portion of a vehicular body and corresponding tire wheel and each having a piston member defining a fluid upper chamber and a fluid lower chamber and damping coefficient varying means associated with the piston member, said damping coefficient varying means operatively varying its position in response to a control signal so that the damping coefficient at either stroke side of the chambers defined by the piston member is set to a target damping coefficient; b) bouncing component detecting means for detecting a vertical sprung mass speed at an adjacent position of the vehicular body on which each shock absorber is placed and driving a bouncing component for each tire wheel position; c) pitching component detecting means for detecting a pitching component of the vehicle body; d) rolling component detecting means for detecting a rolling component of the vehicle body; and e) controlling means for deriving the control signal for each shock absorber located at front tire wheel sides on the basis of at least the bouncing component, driving the control signal for each shock absorber located at rear tire wheel sides on the basis of at least one of the pitching component and rolling component and outputting the control signal to each damping coefficient varying means of the corresponding shock absorbers so to provide the target damping coefficient therein.

BRIEF DESCRIPTION OF THE DRAWINGS

FIG. 6 is an explanatory view of a rotation position of a damping coefficient varying member of each shock absorber to generate a varied damping force in the first preferred embodiment shown in FIGS. 1 through 5.

FIG. 17 is a circuit block diagram of the damping coefficient controlling apparatus in the third embodiment according to the present invention.

FIG. 19 is a circuit block diagram of the damping coefficient controlling apparatus in a fourth embodiment.

FIG. 26 is a control flowchart executed by the control unit in the sixth embodiment shown in FIG. 25.

FIGS. 27 (A) through 30 (B) are characteristic graphs of bouncing coefficients, pitching coefficients, and rolling coefficients with respect to a vehicle speed in the sixth preferred embodiment shown in FIG. 26.

DESCRIPTION OF THE PREFERRED EMBODIMENTS

Reference will hereinafter be made to the drawings in order to facilitate a better understanding of the present invention.

(First Preferred Embodiment)

Figure 1:
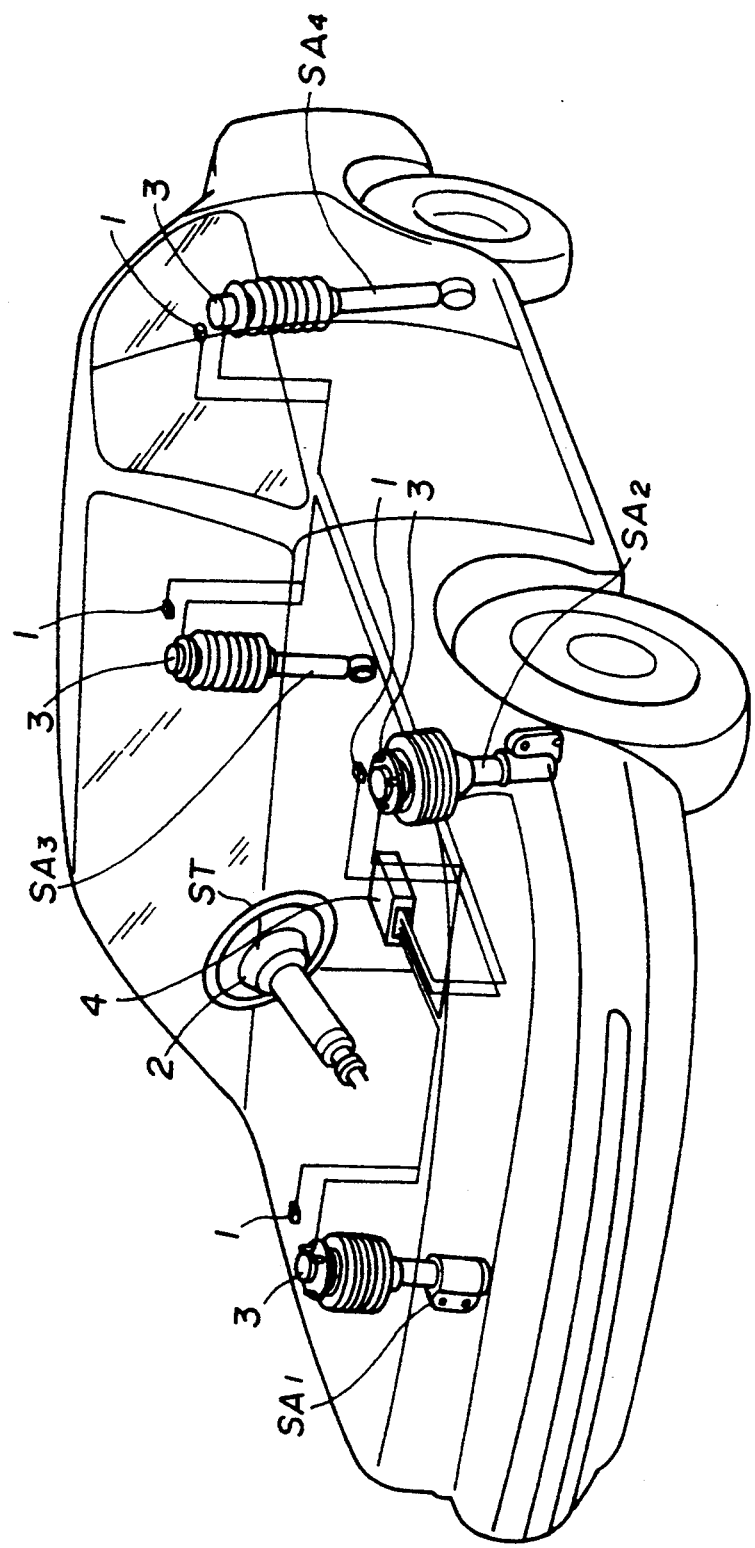
FIG. 1 is an overall view of an apparatus for controlling each damping coefficient of four shock absorbers in a first preferred embodiment according to the present invention.

FIG. 1 shows a first preferred embodiment of an apparatus for controlling each damping coefficient for shock absorbers applicable to an automotive vehicle.

Four shock absorbers $SA_1$, $SA_2$, $SA_3$, and $SA_4$ are interposed between a part of a vehicle body (sprung mass) and a corresponding road wheel (unsprung mass). It is noted that for explanation purposes, each shock absorber is representatively denoted by SA.

A vertical acceleration sensor 1 is disposed on the vehicle body adjacent to each shock absorber SA for detecting a vertical acceleration of the sprung mass (hereinafter referred to as a vertical G sensor). A control unit 4 is installed on the vehicle body adjacent to a driver's seat for receiving each signal derived from various sensors and outputting a drive signal determined according to a control signal V to each pulse motor 3 of the corresponding shock absorber SA as will be described later.

Figure 2:
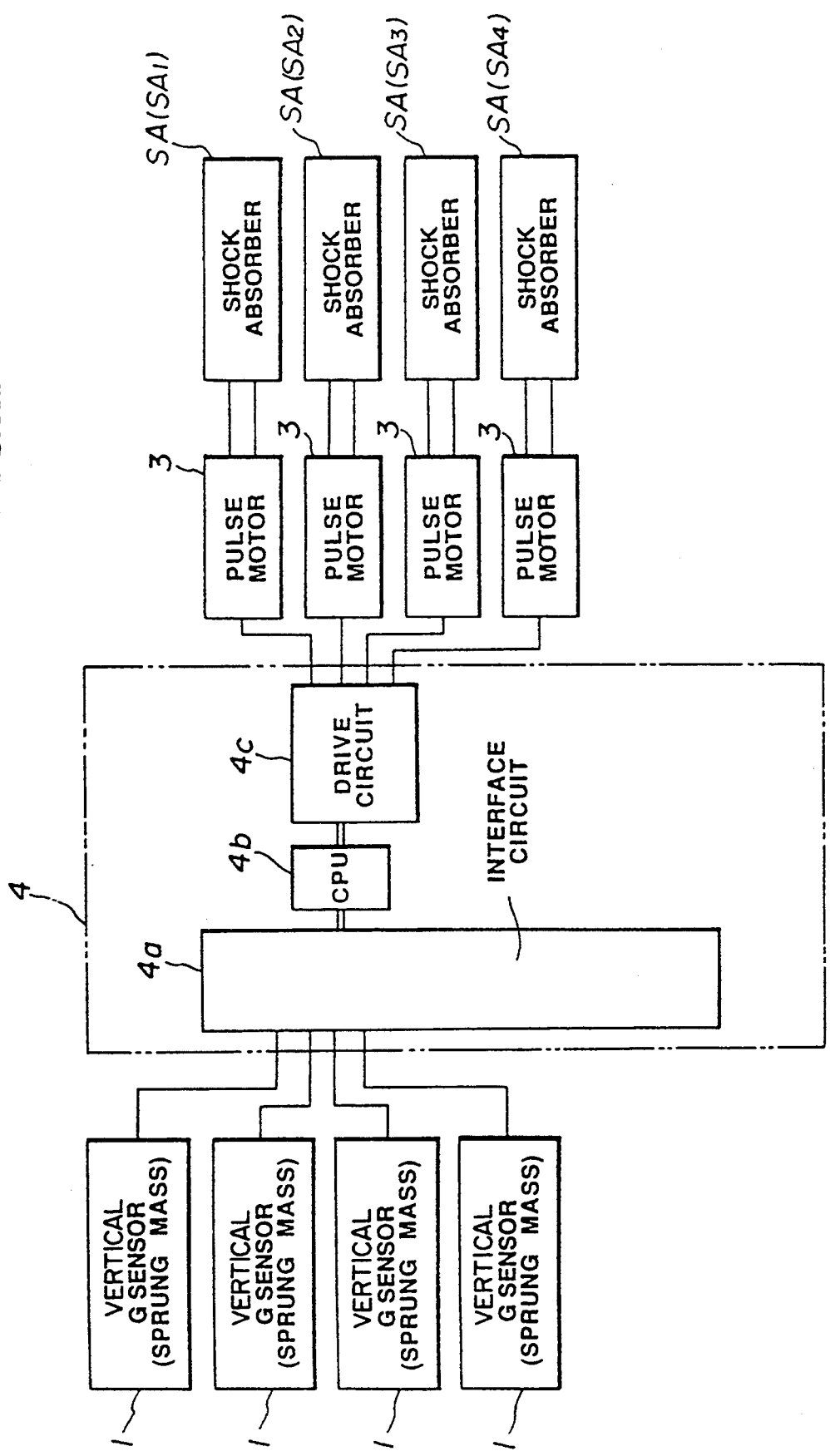
FIG. 2 is a schematic circuit block diagram of the apparatus for controlling each damping coefficient of four shock absorbers in the first preferred embodiment according to the present invention.

FIG. 2 shows a circuit block diagram of the damping coefficient controlling apparatus shown in FIG. 1.

In FIG. 2, the control unit 4 includes: an interface circuit 4a, CPU (Central Processing Unit or microprocessor) 4b, and a drive circuit 4c.

The interface circuit 4a receives vertical G signals derived from each longitudinal G sensor 1.

Figure 13:
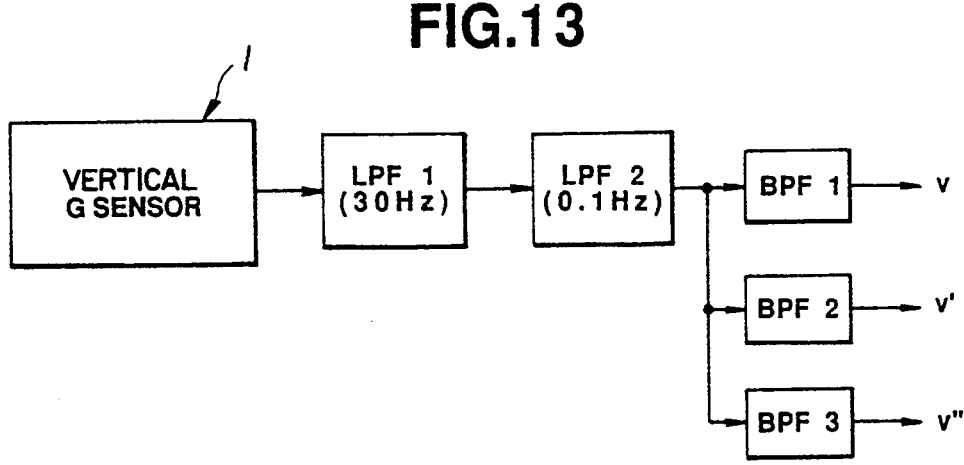
FIG. 13 is a circuit block diagram of an internal interface circuit of the control unit to derive a vertical sprung mass speed v, pitching rate v', and rolling rate v" in the first embodiment shown in FIG. 2.

The interface circuit 4a includes a filter circuitry having five filters for each vertical G sensor 1 as shown in FIG. 13.

In FIG. 13, an LPF 1 is a first low pass filter for eliminating a higher frequency band (over 30 Hz) from the input signal of the vertical G sensor 1.

An LPF 2 is a second low pass filter for integrating the signal passed from the LPF 1 to convert the vertical acceleration into a sprung mass (vertical) speed.

A BPF 1 (Band Pass Filter) is a band pass filter which only passes a signal component of predetermined frequency band including a sprung mass resonance frequency to form a bouncing (bounce) signal component v ($v_1$, $v_2$, $v_3$, and $v_4$) and each subscript 1, 2, 3, 4 denotes a position of each vertical G sensor 1 corresponding to the shock absorber $SA_{1, 2, 3, 4}$.

A BPF 2 is a band pass filter which only passes a signal component of another predetermined frequency band including a pitching resonance frequency to form a pitching (pitch) signal component v' ($v'_1$, $v'_2$, $v'_3$, and $v'_4$).

A BPF 3 is a band pass filter which only passes a signal component of still another predetermined frequency band including a rolling resonance frequency to form a rolling (roll) signal component v" ($v''_1$, $v''_2$, $v''_3$, and $v''_4$).

In the first preferred embodiment, each value of the bouncing resonance frequency, the pitching resonance frequency, and rolling resonance frequency is different. However, if they have approximate values with one another, only BPF 1 may be used.

Figure 3:
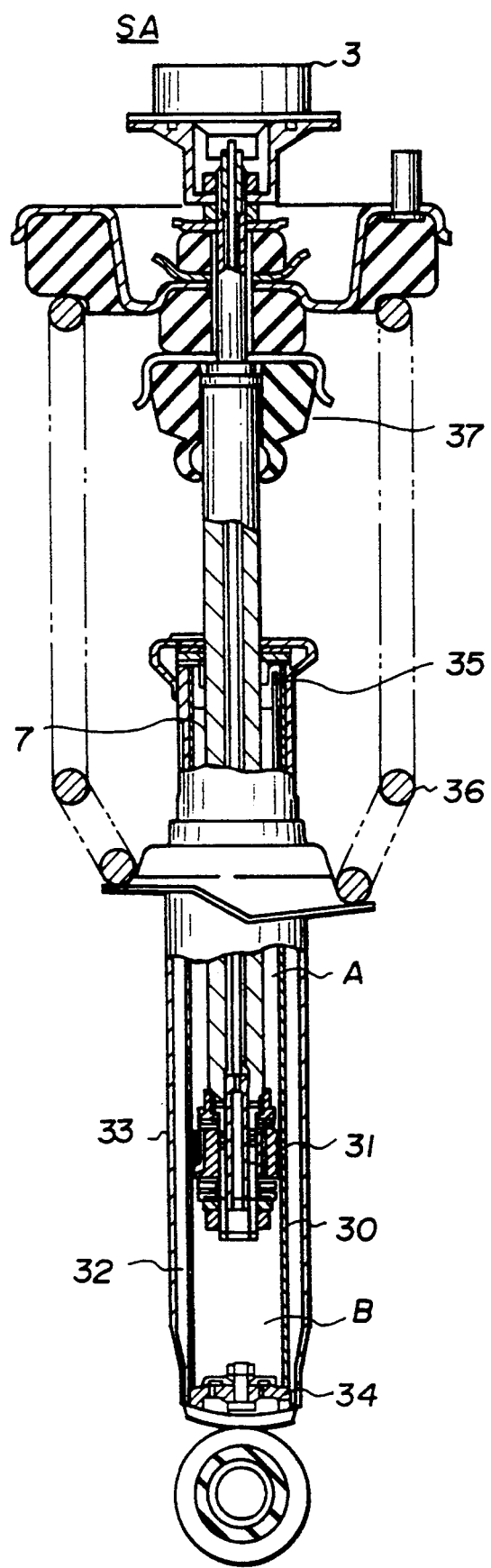
FIG. 3 is a cross sectioned side view of each shock absorber SA shown in FIGS. 1 and 2.

FIG. 3 shows a cross sectioned view of each shock absorber SA.

Each structure of the shock absorber SA is exemplified by a U.S. patent application Ser. No. 07/921,052 filed on Jul. 29, 1992. (The disclosure of the above-identified U.S. patent application is herein incorporated by reference.)

Each shock absorber SA includes: a cylinder 30; a piston member 31 for defining an upper chamber A and a lower chamber B; an outer envelope 33 to form a reservoir 32 on an outer periphery of the cylinder 30; a base 34 defining the lower chamber B and reservoir 32; a guide member 35 for slidably guiding a piston rod 7 linked to the piston member 31; a suspension spring 36 interposed between the outer envelope 33 and vehicle body; and a bumper rubber (bush) 37.

Figure 4:
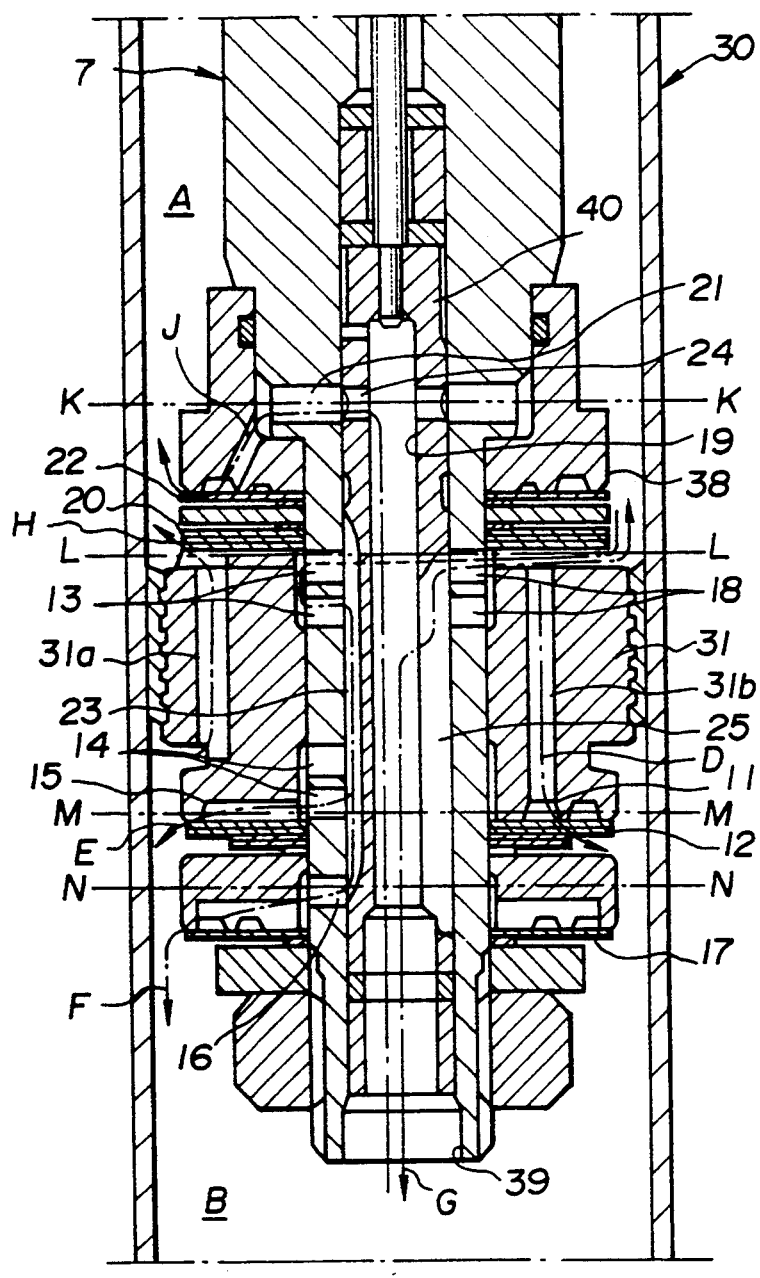
FIG. 4 is a cross sectioned side view of a piston member of each shock absorber SA shown in FIG. 3.

FIG. 4 shows an enlarged cross sectional view of the piston member 31.

The piston member 31 includes: penetrating holes 31a, 31b formed therein; and extension side damping valve 12 and contraction (compression) side damping valve 20, both valves 12 and 20 opening and closing the respective penetrating holes 31a, 31b.

On a tip of the piston rod 7, a communication hole 39 is formed to communicate the upper chamber A and lower chamber B. An adjuster 40 to change a flow passage cross sectional area of the communication hole 39 is formed. In addition, extension stroke side check valve 17 and compression stroke side check valve 22 are formed thereon.

Both check valves 17 and 22 are installed to enable and interrupt a flow passage of the communication hole 39 in accordance with the direction of a fluid flow direction.

The adjuster 40 is pivoted according to a rotation signal from the corresponding pulse motor 3 (refer to FIG. 3). The stud 38 is formed with a first port 21, a second port 13, a third port 18, a fourth port 14, and fifth port 16. Numeral 38 denotes a retainer on which the compression stroke side check valve 22 is seated.

On the other hand, the adjuster 40 is formed with a hollow portion 19, a first lateral hole 24 and second lateral hole 25. Furthermore, a vertical groove 23 is formed on an outer periphery of the adjuster 40.

Hence, four fluid flow communicable passages during the extension stroke of the piston member 31 between the upper chamber A and lower chamber B are as follows: 1) an extension stroke side first flow passage D from the upper chamber A via the penetrating hole 31b and an inside opened valve of the extension stroke damping valve 12 via the lower chamber B; 2) an extension stroke side second flow passage E from the upper chamber A via the outer periphery of the extension stroke side of the opened valve of the extension stroke side damping valve 12, the second port 13, vertical groove 23, and fourth port 14; 3) an extension stroke side third flow passage F from the upper chamber A, via the second port 13, vertical groove 23, and fifth port 16, and 4) a bypass flow passage G from the third port 18, second lateral hole 24, and hollow portion 19 to the lower chamber B.

In addition, the fluid flow communicable passages during the compression stroke include: 1) a compression stroke side first flow passage H which opens the compression stroke side damping valve 20 and which passes the penetrating hole 31a; 2) a compression stroke side second flow passage J which passes the hollow portion 19, first lateral hole 24, and first port 21 and which opens the compression stroke side check valve 22; and 3) the bypass passage G which passes the hollow portion 19, the second lateral hole 25, and third port 18.

Figure 5:
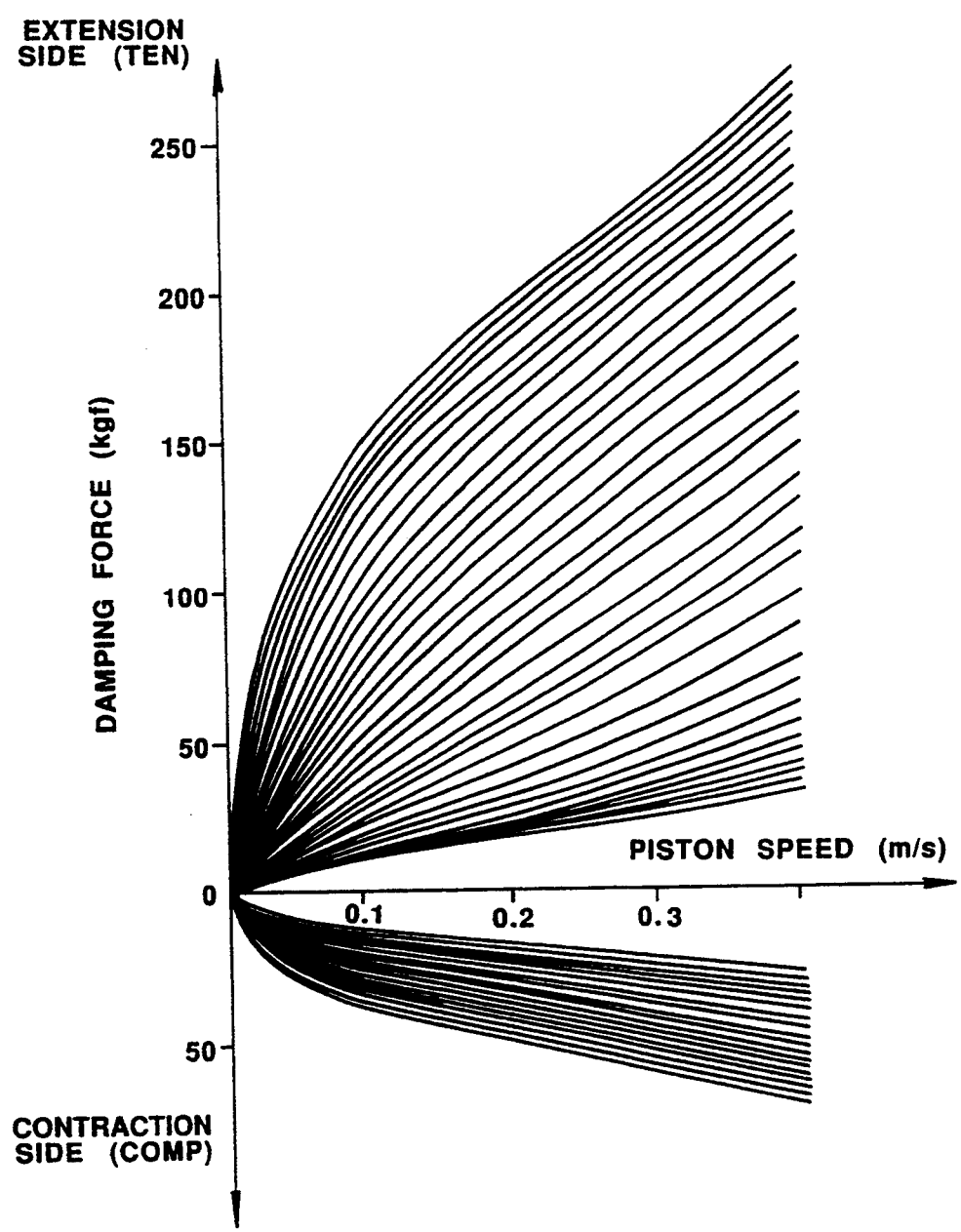
FIG. 5 is a characteristic graph representing a damping force of varied damping coefficients with respect to a piston speed of each shock absorber.
Figure 7A:
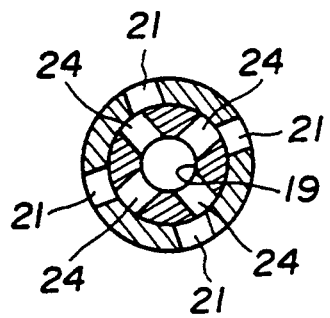
FIGS. 7 (A) through 9 (C) are schematic top views of the varied rotation positions of an adjuster as the damping coefficient varying member shown in FIG. 4.
Figure 7B:
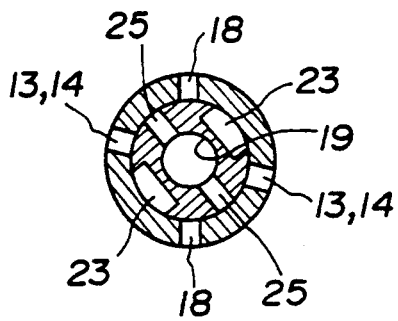
Figure 7C:
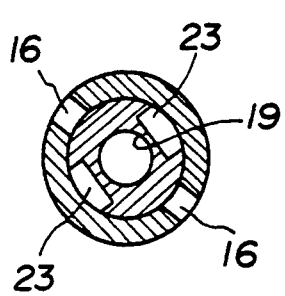

Each shock absorber SA is provided with the adjuster 40 which is pivoted so that a damping coefficient at either of extension or compression stroke side is varied at multiple stages with a characteristic as shown in FIG. 5.

FIG. 6 shows a pivoted position of the adjuster 40 and corresponding adjustable damping coefficient regions related to FIG. 5.

In more details, as shown in FIG. 6, when the adjuster 40 is pivoted in a counterclockwise direction with a soft range SS as a center (position of ② in FIG. 6 and at the soft range SS, both damping coefficients of the extension and compression stroke sides provide soft damping coefficients), each shock absorber SA provides such a state that only the damping coefficient at the extension stroke side is set at the variable multiple stages and, on the other hand, that at the contraction (compression) stroke side is set at a fixed low damping coefficient (hereinafter, referred to as an extension hard region HS). On the contrary, when the adjuster 40 is pivoted in a clockwise direction, only the damping coefficient at the compression stroke side is variably set at any one of multiple stages and that at the extension stroke side is set at a fixed low damping coefficient (hereinafter, referred to as a compression stroke side hard region SH).

Figure 8A:
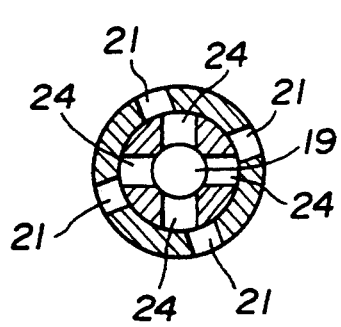
Figure 8B:
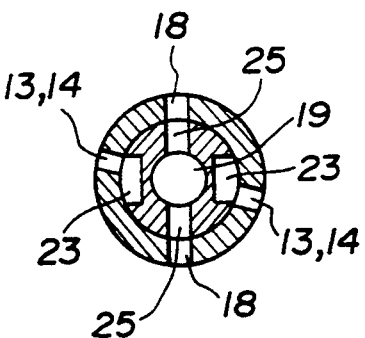
Figure 8C:
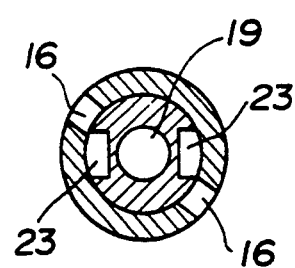
Figure 9A:
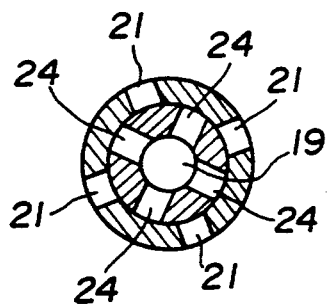
Figure 9B:
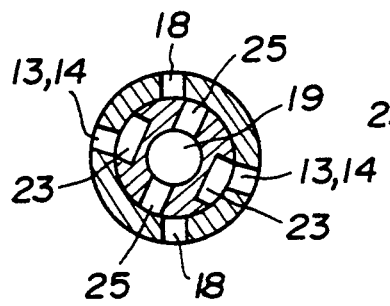
Figure 9C:
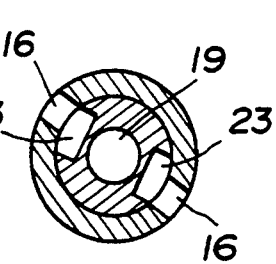

FIGS. 8 (A), 9 (A), and 10 (A) show cross sectioned views of the adjuster 40 cut away along lines of K—K, M—M, and N—N when the adjuster 40 is pivoted at the ① position in FIG. 6.

FIGS. 8 (B), 9 (B), and 10 (B) show cross sectioned views of the adjuster 40 cut away along the lines of K—K, M—M, and N—N when the adjuster 40 is pivoted at the ② position of FIG. 6.

FIGS. 8 (C), 9 (C) and 10 (C) show cross sectioned views of the adjuster 40 cut away along the lines of K—K, M—M, and N—N when the adjuster 40 is pivoted at the ③ position of FIG. 6.

Figure 10:
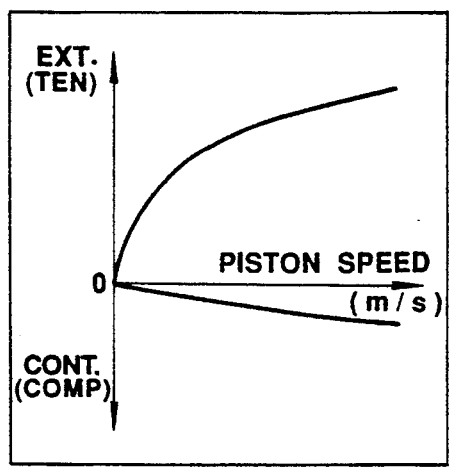
FIGS. 10 through 12 are characteristic graphs of variable damping coefficients of the respective shock absorbers with respect to the piston speed.
Figure 11:
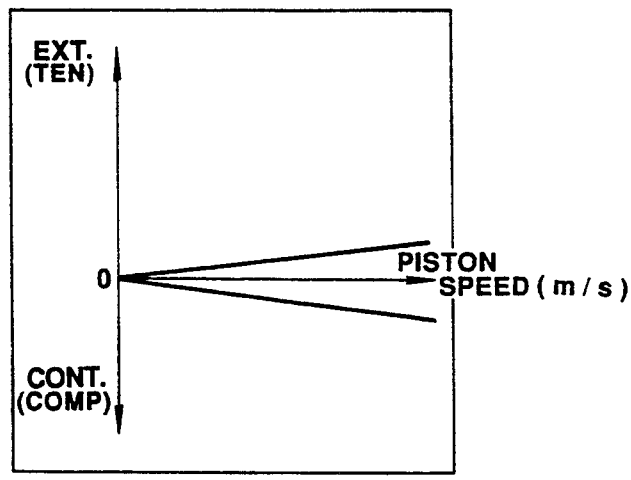
Figure 12:
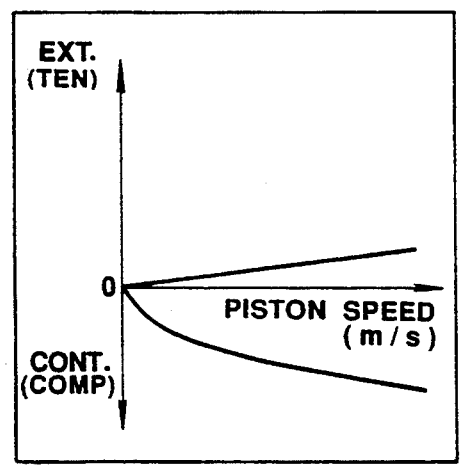

FIGS. 10, 11, and 12 show damping force characteristics when the adjuster 40 is pivoted at the ①, ②, and ③ positions of FIG. 6, respectively.

Next, an operation of the control unit 4 controlling the corresponding pulse motor 3 using the drive signal supplied to the motor 3 will be described with reference to a flowchart of FIG. 14.

Figure 14:
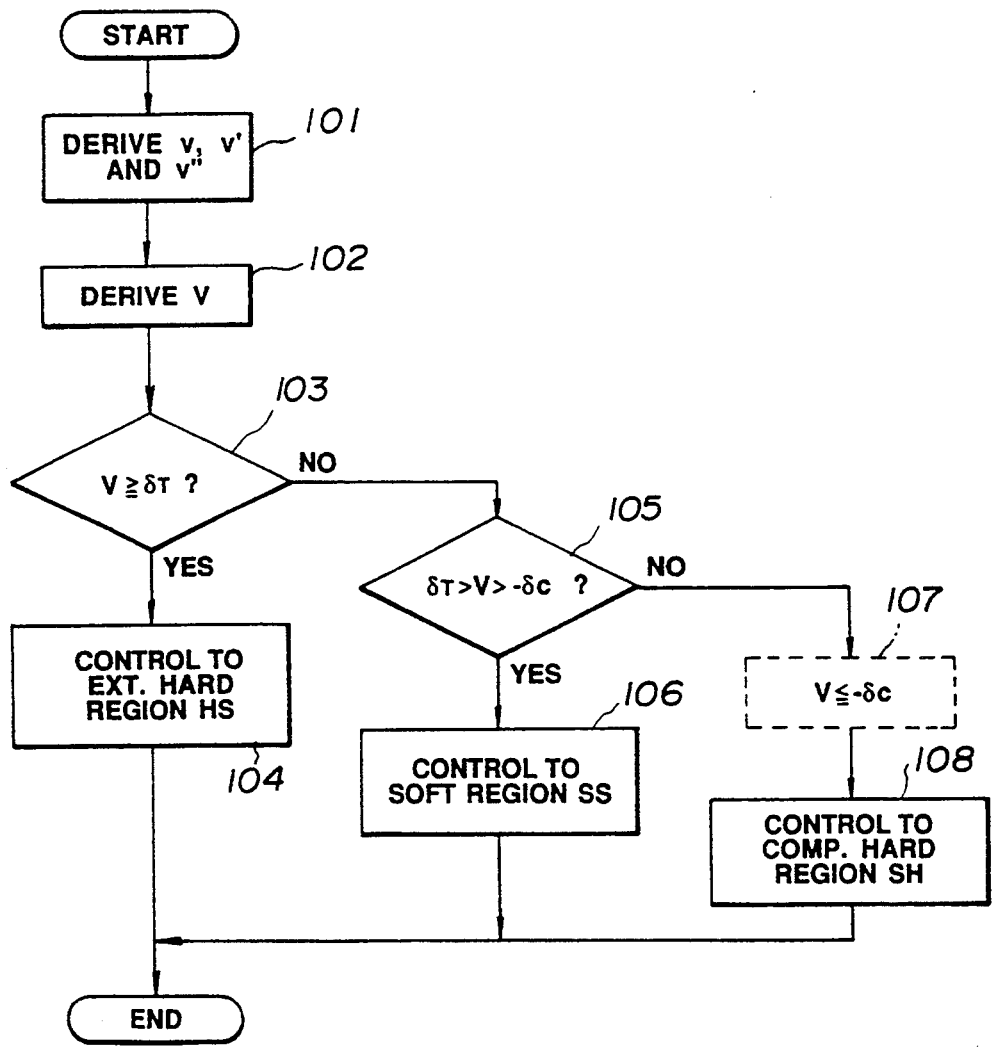
FIG. 14 is a control flowchart executed by the control unit in the first embodiment shown in FIG. 2.

Such a control as shown in FIG. 14 is carried out individually for each shock absorber SA.

In a step 101, the CPU 4b derives vertical acceleration values derived from the respective vertical G sensors 1, processes them by means of the respective filter circuits LPF 1, LPF 2, BPF 1, BPF 2, and BPF 3, and derives the bouncing component signal v ($v_1$, $v_2$, $v_3$, $v_4$), the pitching component signal v' ($v'_1$, $v'_2$, $v'_3$, $v'_4$), and rolling component signal v" ($v''_1$, $v''_2$, $v''_3$, $v''_4$).

In a step 102, the CPU 4b calculates a control signal V ($V_1$, $V_2$, $V_3$, and $V_4$) of each tire wheel position on the basis of each signal component v, v', and v" using the following equation (1).

FRONT, RIGHT TIRE WHEEL:

$V_1 = \alpha_f/4$
$(v_1+v_2+v_3+v_4)+\beta_f(v'_1-v'_3)+\tau_f(v''_1-v''_2)$

FRONT, LEFT TIRE WHEEL:

$V_2 = \alpha_f/4$
$(v_1+v_2+v_3+v_4)+\beta_f(v'_2-v'_4)+\tau_f(v''_2-v''_1)$

REAR, RIGHT TIRE WHEEL:

$V_3 = \alpha_r/4$
$(v_1+v_2+v_3+v_4)+\beta_r(v'_3-v'_1)+\tau_r(v''_3-v''_4)$

REAR, LEFT TIRE WHEEL:

$$V_4 = \alpha_r/4$$
$$(v_1+v_2+v_3+v_4)+\beta_r(v'_4-v'_2)+\tau_r(v''_4-v''_3) \quad (1)$$

A right first term of each tire wheel equation (1) denotes a bouncing rate, a left second term of each tire wheel equation (1) denotes a pitching rate, and a left third term of each tire wheel equation (1) denotes a rolling rate.

In the equation (1), $\alpha_f$, $\beta_f$, and $\tau_f$ denote respective proportional constants on the corresponding front tire wheels.

$\alpha_r$, $\beta_r$, and $\tau_r$ denote respective proportional constants on the corresponding rear tire wheels.

$v_1$, $v'_1$, and $v''_1$ denote values derived from the vertical sprung mass speed signal related to the front, right tire wheel;

$v_2$, $v'_2$, and $v''_2$ denote values derived from the vertical sprung mass speed signal related to the front, left tire wheel;

$v_3$, $v'_3$, and $v''_3$ denote values derived from the vertical sprung mass speed signal related to the rear, right tire wheel; and $v_4$, $v'_4$, and $v''_4$ denote values derived from the vertical sprung mass speed signal related to the rear, left tire wheel.

On the basis of the signals derived from the respective vertical G sensors 1, each of bounce rate, pitch rate, and rolling rate is calculated.

In a step 103, the CPU 4b determines whether each value of V is above (equal to and higher than) a predetermined threshold $\delta_T$.

If YES in the step 103, the routine goes to a step 104. If NO in the step 103, the routine goes to a step 105.

In the step 104, the CPU 4b outputs the drive signal to the pulse motor 3 so that the damping coefficient of the corresponding shock absorber SA is set at the extension hard region HS.

In the step 105, the CPU 4b determined whether each control signal V is in an intermediate range from the predetermined threshold value $\delta_T$ and another predetermined threshold value $-\delta_C$.

If YES in the step 105, the routine goes to a step 106. If NO in the step 105, the routine goes to a step 107.

In the step 106, the control unit 4 outputs the drive signal to the pulse motor 3 so that the damping coefficient is set at the soft region SS.

In the step 107, the CPU 4b confirms that $V \leq -\delta_C$ and the routine goes to a step 108.

In the step 108, the control unit 4 outputs the drive signal so that the damping coefficient of the corresponding shock absorber SA is set at the compression had region SH.

Next, the operation of the first preferred embodiment will be described with reference to a timing chart of FIG. 15.

Figure 15:
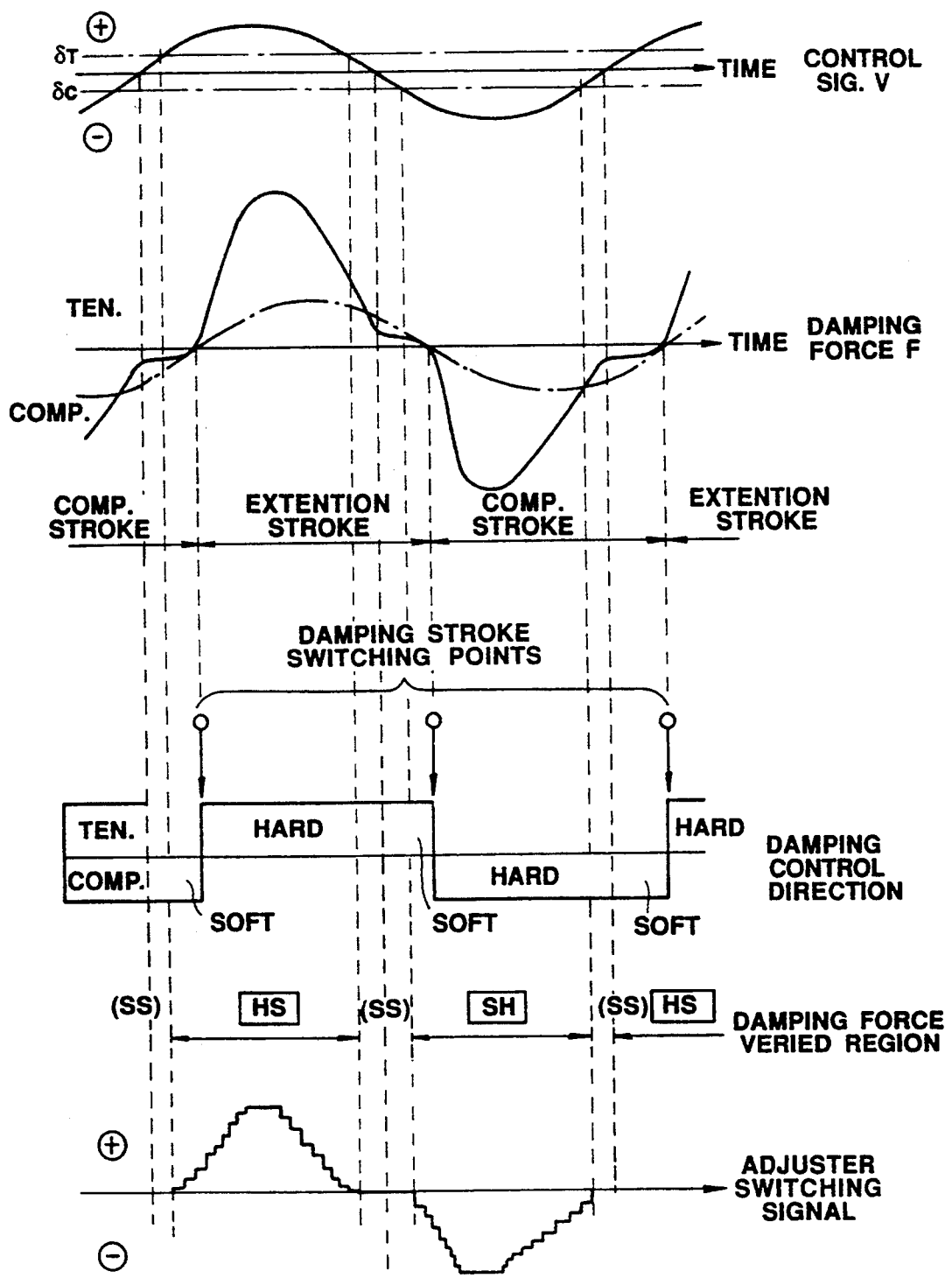
FIG. 15 is a integrally timing chart for explaining an operation of the first embodiment shown in FIG. 2.

Suppose that the longitudinal sprung mass speed is changed as shown by the control signal V of FIG. 15.

As shown in FIG. 15, when the control signal V falls in a value between the predetermined threshold values $\delta_T$, $-\delta_C$, the corresponding shock absorber SA is controlled to provide the soft region SS.

In addition, when the control signal V is above the predetermined threshold value $\delta_T$, the corresponding shock absorber SA is controlled to provide the extension hard region HS, thereby fixing the compression stroke side to a low damping coefficient. On the other hand, the extension stroke side damping coefficient is changed in proportion to the control signal V.

At this time, the damping coefficient C is controlled as follows; $C = k \cdot V$ (k denotes a control constant).

In addition, when the control signal V is below the threshold value $-\delta_C$, the corresponding shock absorber SA is controlled at the compression stroke side hard region SH so that the extension stroke side is fixed at the low damping coefficient and the compression stroke side damping coefficient is changed in proportion to the control signal V. At this time, the damping coefficient C at the compression stroke side is controlled as $C = k \cdot V$.

The effects achievable by the first embodiment will be listed below:

a) Since a sufficient control force is generated according to the rolling and pitching as well as the bouncing, the suspension control system in the first embodiment can achieve a favorable vehicular comfort and steering stability.

b) Since only the longitudinal G sensors are used in the first embodiment, the number of parts of the controlling apparatus can be reduced and cost thereof can be reduce.

c) Since the respectively different constants $\alpha$, $\beta$, and $\tau$ are used to derive the bouncing rate, rolling rate, and pitching rate, each rate can accurately be derived on the basis of the longitudinal sprung mass speed even when the sprung mass resonance frequency, pitch resonance frequency, and rolling resonance frequency are different in the vehicle used in the preferred embodiment.

(Second Preferred Embodiment)

A second preferred embodiment is different from the first embodiment in a part of the control unit 4.

That is to say, the structure of the damping coefficient controlling apparatus is almost the same as in the first preferred embodiment but is different in the derivation of the control signal V ($V_1$, $V_2$, $V_3$, $V_4$) as expressed in the equation (2).

FRONT, RIGHT TIRE WHEEL:

$$V_1 = \alpha_f v_1 + \beta_f(v'_1 - v'_3) + \gamma_f(v''_1 - v''_2)$$

FRONT, LEFT TIRE WHEEL:

$$V_2 = \alpha_f v_2 + \beta_f(v'_2 - v'_4) + \gamma_f(v''_2 - v''_1)$$

REAR, RIGHT TIRE WHEEL:

$$V_3 = \alpha_r v_3 + \beta_r(v'_3 - v'_1) + \gamma_r(v''_3 - v''_4)$$

REAR, LEFT TIRE WHEEL:

$$V_4 = \alpha_r v_4 + \beta_r(v'_4 - v'_2) + \gamma_r(v''_4 - v''_3). \quad (2)$$

As appreciated from each right first term of the equation (2), the bouncing component v is input from only that from the corresponding position of the shock absorber SA. Hence, in the second embodiment, the control is such as to emphasize each bouncing component and to suppress the damping characteristic against the rolling and pitching motions of the vehicle body.

(Third Preferred Embodiment)

Figure 16:
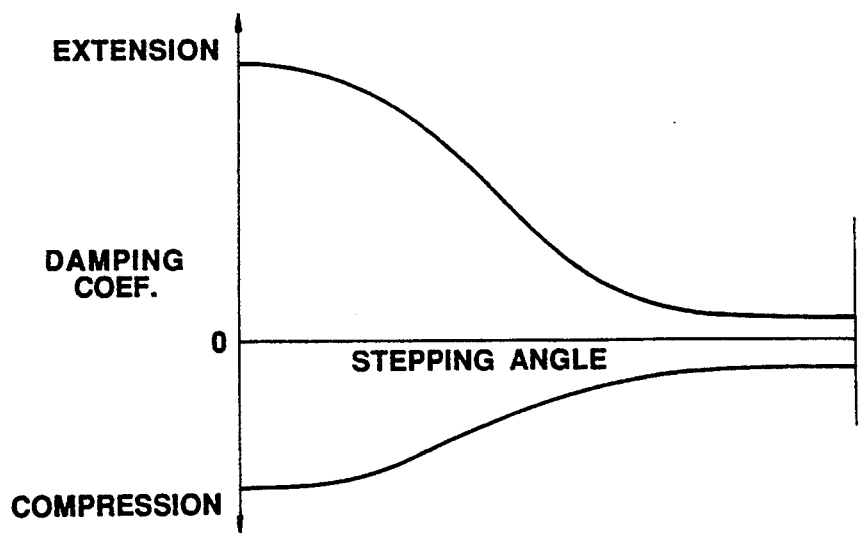
FIG. 16 is characteristic graph of a relationship between a stepping angle and damping coefficient at both extension and compression stroke sides in a third embodiment of the damping coefficient controlling apparatus.

In the third embodiment, each shock absorber SA having a variable damping coefficient is used as shown in FIG. 16. In each shock absorber SA, when the pulse motor 3 is driven, the corresponding shock absorber SA is controlled to vary the damping coefficient in a range from a highest damping coefficient to a lowest damping coefficient at both extension and compression strokes.

Such a shock absorber as described above is exemplified by a Japanese Utility Model Registration Application First Publication No. Showa 63-112914 published on.

FIG. 17 shows a circuit block diagram of an apparatus for controlling each damping coefficient in the third preferred embodiment according to the present invention.

As shown in FIG. 17, weight sensors (as means for detecting a relative speed between the sprung mass and unsprung mass speeds) 6, 6, 6, and 6 are installed on an attaching portion of each shock absorber SA to detect a damping force F (corresponds to the relative speed) as its weight.

Figure 18:
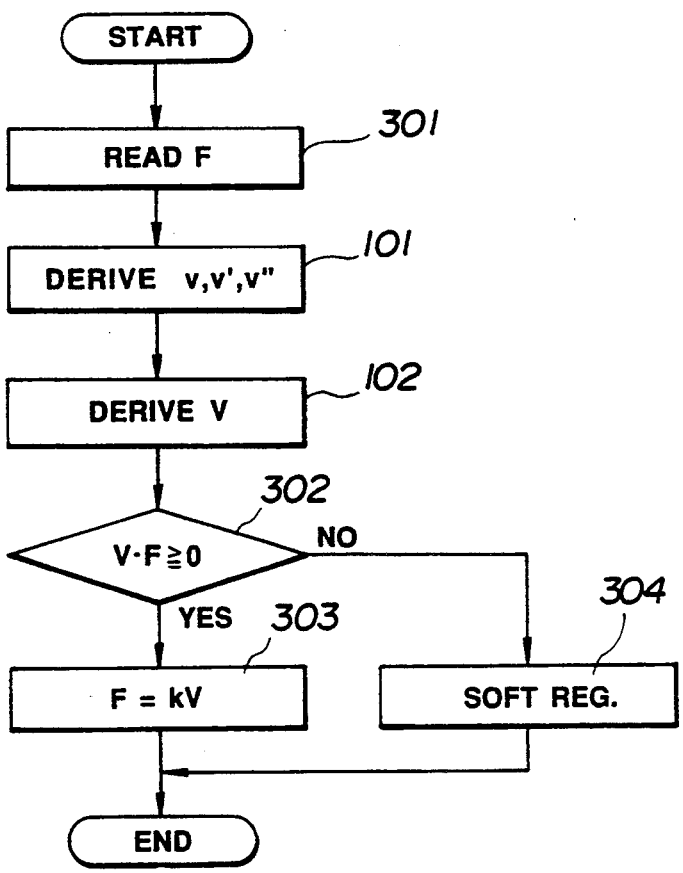
FIG. 18 is a control flowchart executed by the control unit in the third embodiment shown in FIG. 17.

FIG. 18 shows an operational flowchart of the control unit 4 in the case of the third embodiment.

In a step 301, the CPU 4b reads the damping force F detected by means of the corresponding weight sensor 6. Thereafter, the routine goes to the steps 101 and 102 in the same way as in the first embodiment shown in FIG. 4. Then, the routine goes to a step 302.

In the step 302, the CPU 4b determines whether the damping force F has the same sign as the control signal V. If YES in the step 302, the routine goes to a step 303. If NO in the step 302, the routine goes to a step 304.

In the step 303, the damping coefficient for the corresponding shock absorber SA is controlled so that the damping force F is expressed as F=k V.

In the step 304, both damping coefficients at the extension and compression strokes provide lowest damping coefficients.

It is noted that although, in the first, second, and third embodiments, the pitch rate is derived on the basis of the difference of the sprung mass speeds between the front tire wheel side and rear tire wheel side and rolling rate is derived on the basis of the difference of the sprung mass speeds between the right and left tire wheel sides, a sensor such as gyroscope which detects a pitch angle change or which detects a rolling angle change may alternatively be used.

(Fourth Preferred Embodiment)

FIG. 19 shows a circuit block diagram of the damping coefficient controlling apparatus in the fourth preferred embodiment according to the present invention.

As shown in FIG. 19, the configuration of the damping coefficient controlling apparatus in the fourth preferred embodiment is almost the same as in the first embodiment shown in FIG. 2.

However, as shown in FIG. 19, the interface circuit 4a of the control unit 4 receives a steering angle signal from a steering angle sensor 2, a brake signal from a brake sensor 5 for predictively detecting an abrupt deceleration condition of the vehicle, a fuel injection pulsewidth signal from a fuel injection valve sensor 6A for predictively detecting an abrupt acceleration condition of the vehicle by detecting a pulsewidth of an energizing signal supplied to a fuel injection valve(s) of a vehicular engine, and a vehicle speed signal from a vehicle speed sensor 8.

The other structures of the control unit 4, vertical G sensors 1, 1, 1, 1, pulse motors 3, 3, 3, 3 and shock absorbers SA are the same as those in the first embodiment shown in FIG. 2.

The structures of the shock absorbers SA in the fourth embodiment are the same as those shown in FIGS. 3 through 9 (C).

Figure 20:
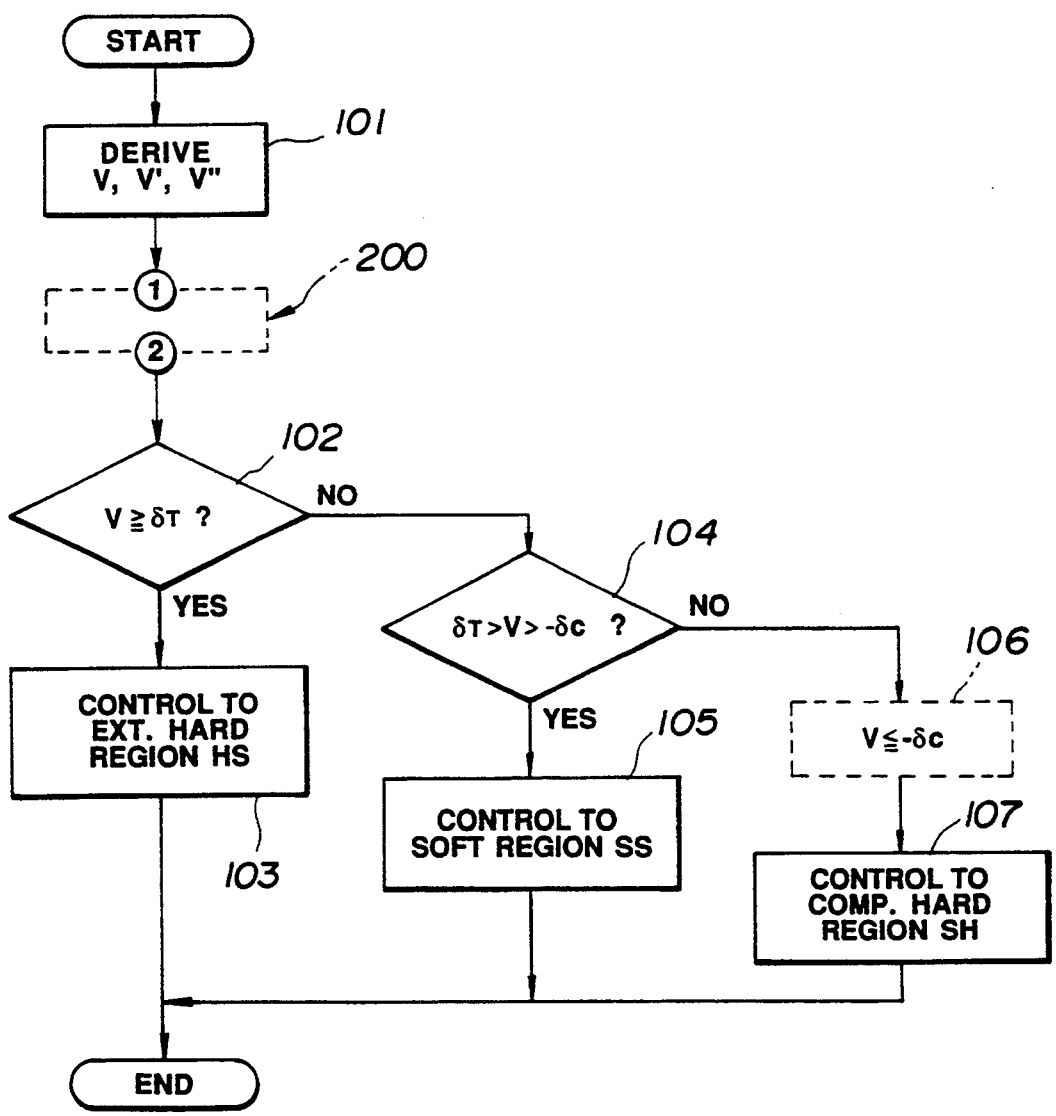
FIG. 20 is a main control flowchart executed by the control unit in the fourth embodiment shown in FIG. 19.

FIG. 20 shows a control flowchart executed by the control unit 4.

It is noted that although the control flowchart shown in FIG. 20 is substantially the same as that of the first embodiment shown in FIG. 14, the difference exits in a step 200 located between the step 101 and step 102.

Figure 21:
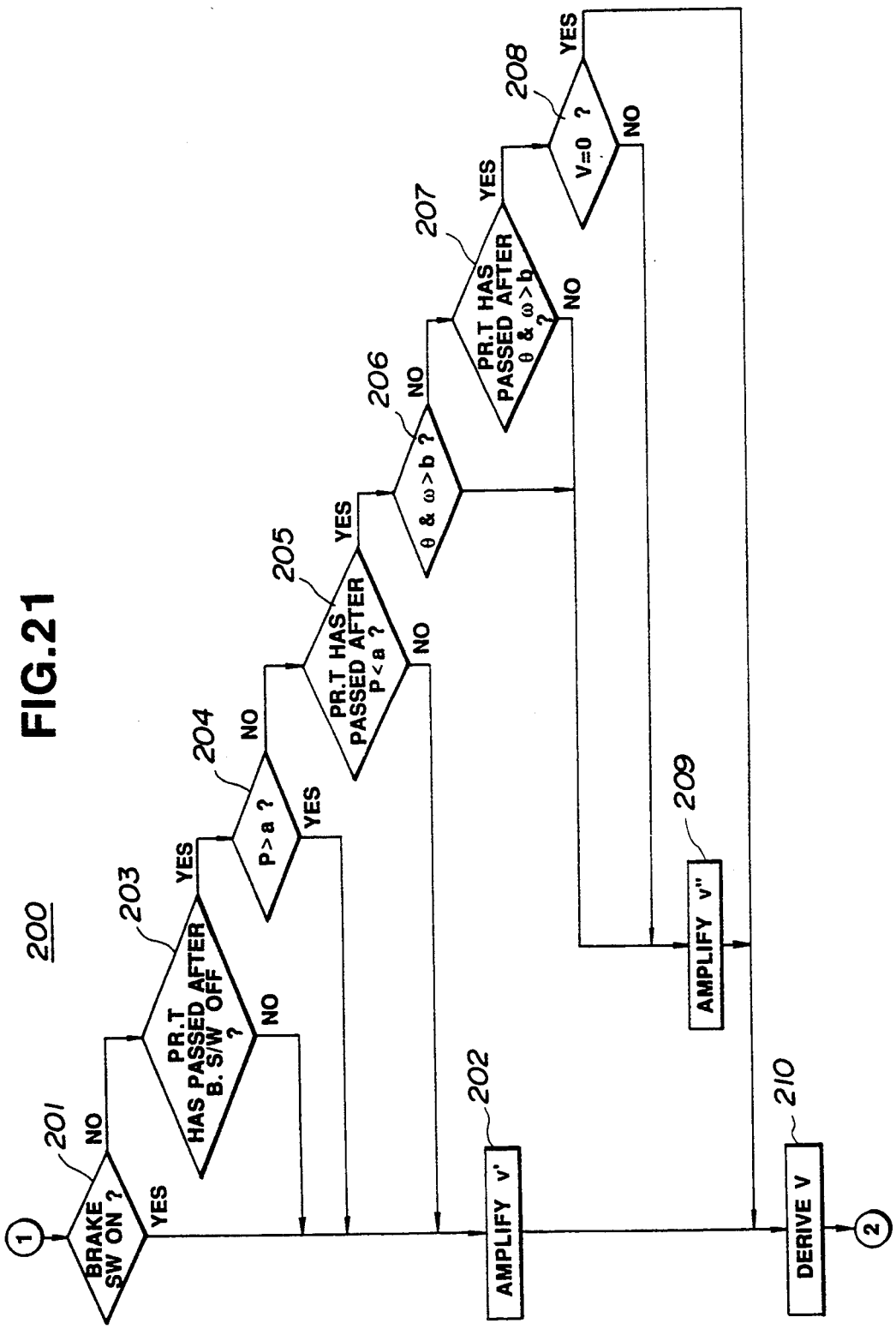
FIG. 21 is a subroutine of a step 200 shown in FIG. 20.

That is to say, a subroutine of the step 200 is shown in FIG. 21. The subroutine shown in FIG. 21 is a routine to derive the control signal V.

In details, in a step 201, the CPU 4b determines whether a brake switch is turned on (pitch condition is ON) on the basis of the brake signal from the brake sensor 5. If YES in the step 201, the routine goes to a step 202. If NO in the step 201, the routine goes to a step 203.

In the step 202, the CPU 4b determines that the pitch condition is turned on and amplifies the pitch component signal v' (v' is already described in the first embodiment) and thereafter the routine goes to a step 210.

On the other hand, in the step 203, the CPU 4b determines whether a predetermined period of time has passed upon the turning off of the brake switch.

If NO in the step 203, the routine returns to the step 202. If YES in the step 203, the routine goes to a step 204.

In the step 204, the CPU 4b determines whether a pulsewidth by which the fuel is supplied to the engine exceeds a predetermined threshold value a (pitch condition is turned on). If YES in the step 204, the routine returns to the step 202. If NO in the step 204, the routine goes to a step 205.

In the step 205, the CPU 4b determines whether the predetermined period of time has passed after the fuel injection pulsewidth P is above the threshold value a (pitch condition is ON). If NO in the step 205, the routine goes to the step 202. If YES in the step 205, the routine goes to a step 206.

Figure 22:
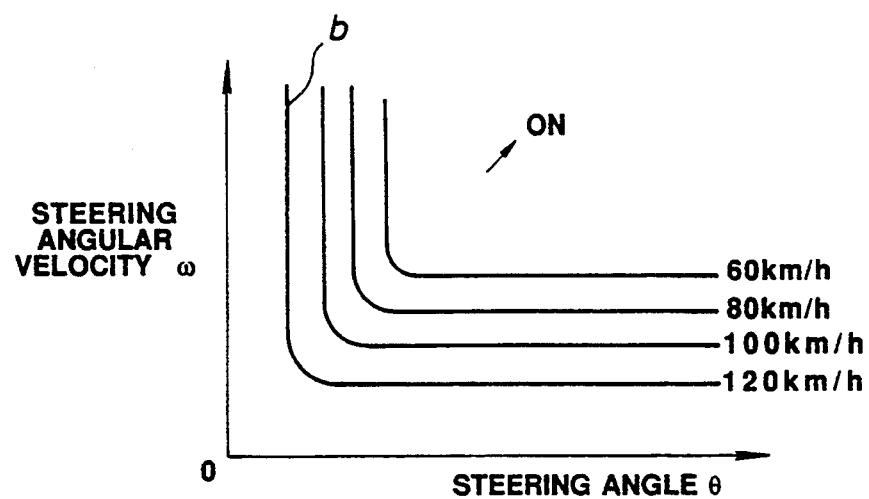
FIG. 22 is a characteristic graph of a threshold value of a vehicle speed related to a steering angle and steering angular velocity in the case of the fourth embodiment shown in FIGS. 19 to 21.

In the step 206, the CPU 4b determines whether both a steering angle signal $\theta$ derived from the steering angle sensor 2 and a steering angular velocity $\omega$ calculated on the basis of the steering angle signal $\theta$ are above predetermined threshold values b (steering condition ON) on the basis of a map shown in FIG. 22.

If YES in the step 206, the routine goes to a step 209. If NO in the step 206, the routine goes to a step 207.

The map shown in FIG. 22 has a lateral axis on the steering angle $\theta$ and vertical axis on the steering angular velocity $\omega$. A condition to start the rolling control includes a mapped threshold value b such that the mutual other lowest value corresponding to one of both values of $\theta$ and $\omega$ is set as the threshold value b. The threshold value b is set lower in reverse proportion to the increase in the vehicle speed detected by the vehicle speed sensor 8.

In the step 207, the CPU determines whether both steering angle $\theta$ and steering angular velocity $\omega$ are below the threshold value b and the predetermined period of time has passed (steering condition is ON). If NO in the step 207, the routine goes to a step 209. If YES in the step 207, the routine goes to a step 208.

In the step 209, the CPU 4b determines that the steering condition is ON and amplifies the rolling signal component v". Thereafter, the routine goes to the step 210.

In the step 210, the CPU 4b uses the following equation (1A) to calculate the control signals $V_1$, $V_2$, $V_3$, and $V_4$ for the respective positions of the shock absorbers SA ($SA_1$, $SA_2$, $SA_3$, $SA_4$).

FRONT, RIGHT TIRE WHEEL:

$$V_1 = \alpha_f/4\,(v_1+v_2+v_3+v_4) + \beta_f m_f(v'_1-v'_3) + \tau_f K_f(v''_1-v''_2)$$

FRONT, LEFT TIRE WHEEL:

$$V_2 = \alpha_f/4\,(v_1+v_2+v_3+v_4) + \beta_f m_f(v'_2-v'_4) + \tau_f K_f(v''_2-v''_1)$$

REAR, RIGHT TIRE WHEEL:

$$V_3 = \alpha_r/4\,(v_1+v_2+v_3+v_4) + \beta_r m_r(v'_3-v'_1) + \tau_r K_r(v''_3-v''_4)$$

REAR, LEFT TIRE WHEEL:

$$V_4 = \alpha_r/4\,(v_1+v_2+v_3+v_4) + \beta_r m_r(v'_4-v'_2) + \tau_r K_r(v''_4-v''_3) \quad (1A)$$

In the equation (1A), $m_f$, $k_f$, $m_r$, and $k_r$ denote amplification coefficients (factors) of the proportional constants of $\alpha_f$, $\beta_f$, $\tau_f$, $\alpha_r$, $\beta_r$, and $\tau_r$ (provided that each $m_f$, $k_f$, $m_r$, and $k_r > 1.0$).

Figure 23:
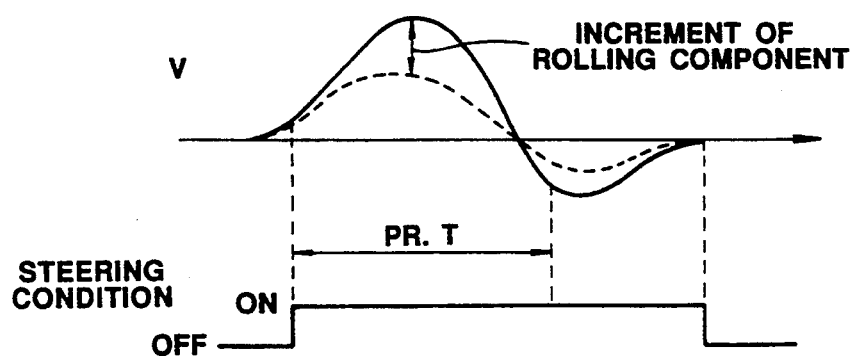
FIG. 23 is a characteristic graph of a control signal V and steering condition in the fourth embodiment shown in FIGS. 19 to 22.

FIG. 23 shows a timing chart representing an operation from the step 206 and to the step 208.

As shown in FIG. 23, the steering condition is turned on when both of the steering angle signal $\theta$ and steering angular velocity $\omega$ are respectively below the predetermined threshold values b. Thereafter, when both the steering angle signal $\theta$ and steering angular velocity $\omega$ are respectively reduced below the predetermined threshold value b, the steering condition is turned to OFF when the control signal V has arrived at 0 (zero).

Next, the operation of the damping coefficient controlling apparatus in the fourth embodiment will be described below with reference to FIG. 24.

The vertical sprung mass speed is varied as denoted by the control signal V.

Figure 24:
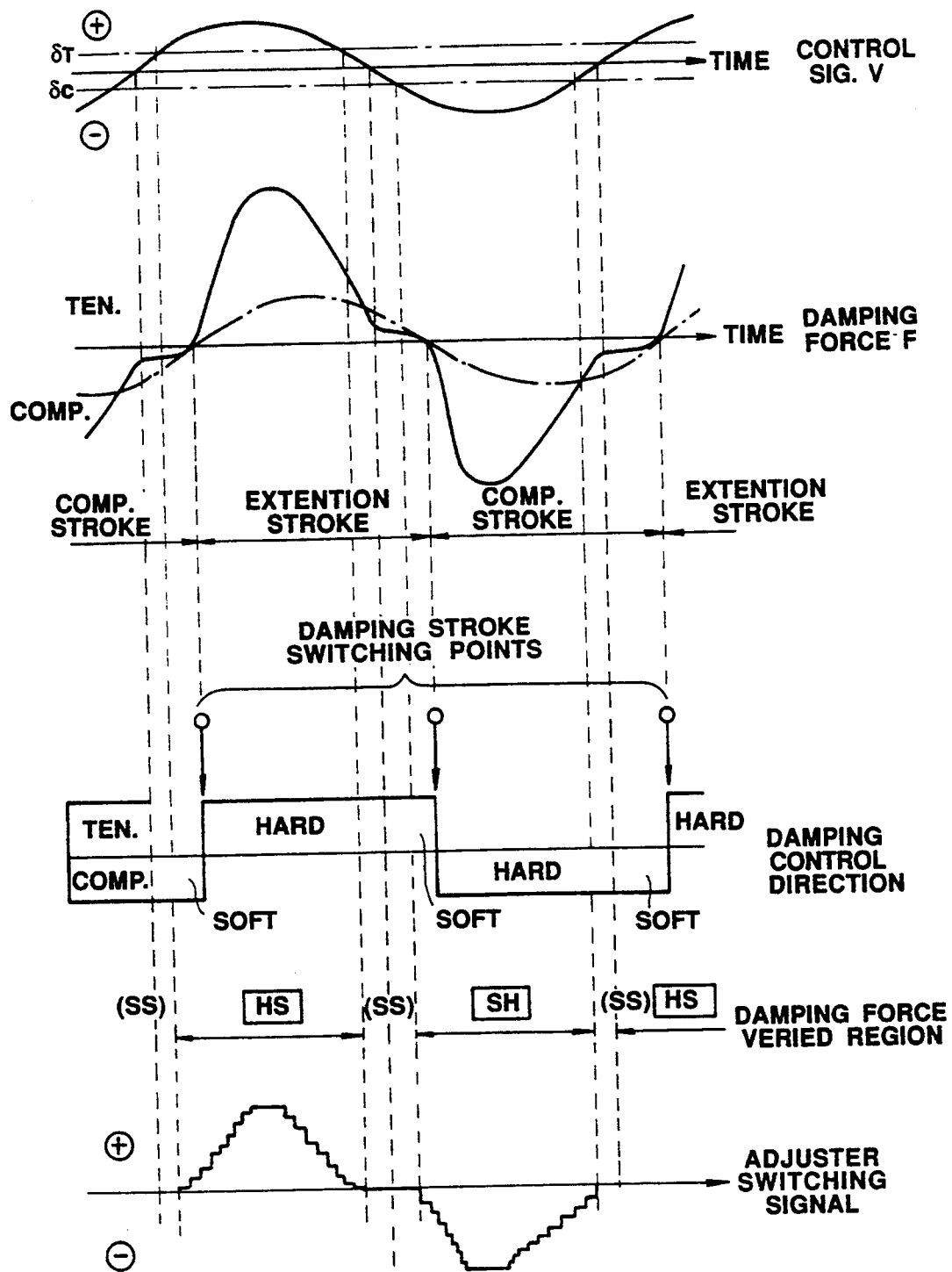
FIG. 24 is a timing chart for explaining an operation of the fourth embodiment shown in FIGS. 19 to 23.

As shown in FIG. 24, the control signal V falls in the range from the predetermined threshold value $\delta_T$, $-\delta_C$, the corresponding shock absorber SA is controlled in the soft region SS.

On the other hand, if the control signal V is above the threshold value $\delta_T$, the corresponding shock absorber SA is controlled in the extension hard region HS but the damping coefficient at the compression stroke is fixed at the low damping coefficient. The damping coefficient at the extension stroke is in proportion to the control signal V.

At this time, the coefficient C is expressed as $C = k \cdot V$.

On the other hand, if the control signal V is below the predetermined threshold value $-\delta_C$, the control unit 4 controls the corresponding shock absorber SA in the compression hard region SH and the extension stroke side in the fixed low damping coefficient.

On the other hand, the damping coefficient at the compression stroke side is varied in proportion to the control signal V. At this time, the damping coefficient C is expressed as $C = k \cdot V$.

The effects achievable by the fourth embodiment are as follows:

1) Since sufficient control force is generated against the rolling and pitching as well as the bouncing, the vehicular comfort is not deteriorated and sufficient damping is achieved with respect to the inertia moment and steering stability can be improved.

2) Since when the bounce rate, pitch rate, and rolling rate are derived, the different constants $\alpha$, $\beta$, and $\tau$ are used, each rate can be derived on the basis of the vertical sprung mass speed even if each of the sprung mass resonance frequency, pitch resonance frequency, and rolling resonance frequency is different.

It is noted that although in the fourth embodiment shown in FIG. 19 the brake sensor 5 is used for detecting the abrupt deceleration of the vehicle according to the brake switch operation, a sensor for detecting a depression force of a brake pedal to derive the abrupt deceleration of the vehicle may be used. It is also noted that although, in the fourth preferred embodiment shown in FIG. 19, the fuel injection pulsewidth sensor 6A is used to detect the abrupt acceleration of the vehicle, a sensor for detecting an increased quantity of intake air per time such as an airflow meter located in an intake manifold of the vehicle engine may be used.

(Fifth Preferred Embodiment)

It is noted that the difference from the fourth embodiment is present in the execution of the control unit 4, i.e., as shown in the equation (2A).

FRONT, RIGHT TIRE WHEEL:

$$V_1 = \alpha_f v_1 + \beta_f m_f(v'_1-v'_3) + \tau_f K_f(v''_1-v''_2)$$

FRONT, LEFT TIRE WHEEL:

$$V_2 = \alpha_f v_2 + \beta_f m_f(v'_2-v'_4) + \tau_f K_f(v''_2-v''_1)$$

REAR, RIGHT TIRE WHEEL:

$$V_3 = \alpha_r v_3 + \beta_r m_r(v'_3-v'_1) + \tau_r K_r(v''_3-v''_4)$$

REAR, LEFT TIRE WHEEL:

$$V_4 = \alpha_r v_4 + \beta_r m_r(v'_4-v'_2) + \tau_r K_r(v''_4-v''_2). \quad (2A)$$

In the fifth embodiment, the bouncing signal component v is input only from that corresponding to the position of the shock absorber SA itself.

The effects in the fifth embodiment are approximately the same as those described in case of the second embodiment. A more precise control for each damping coefficient can be achieved.

(Sixth Preferred Embodiment)

Figure 25:
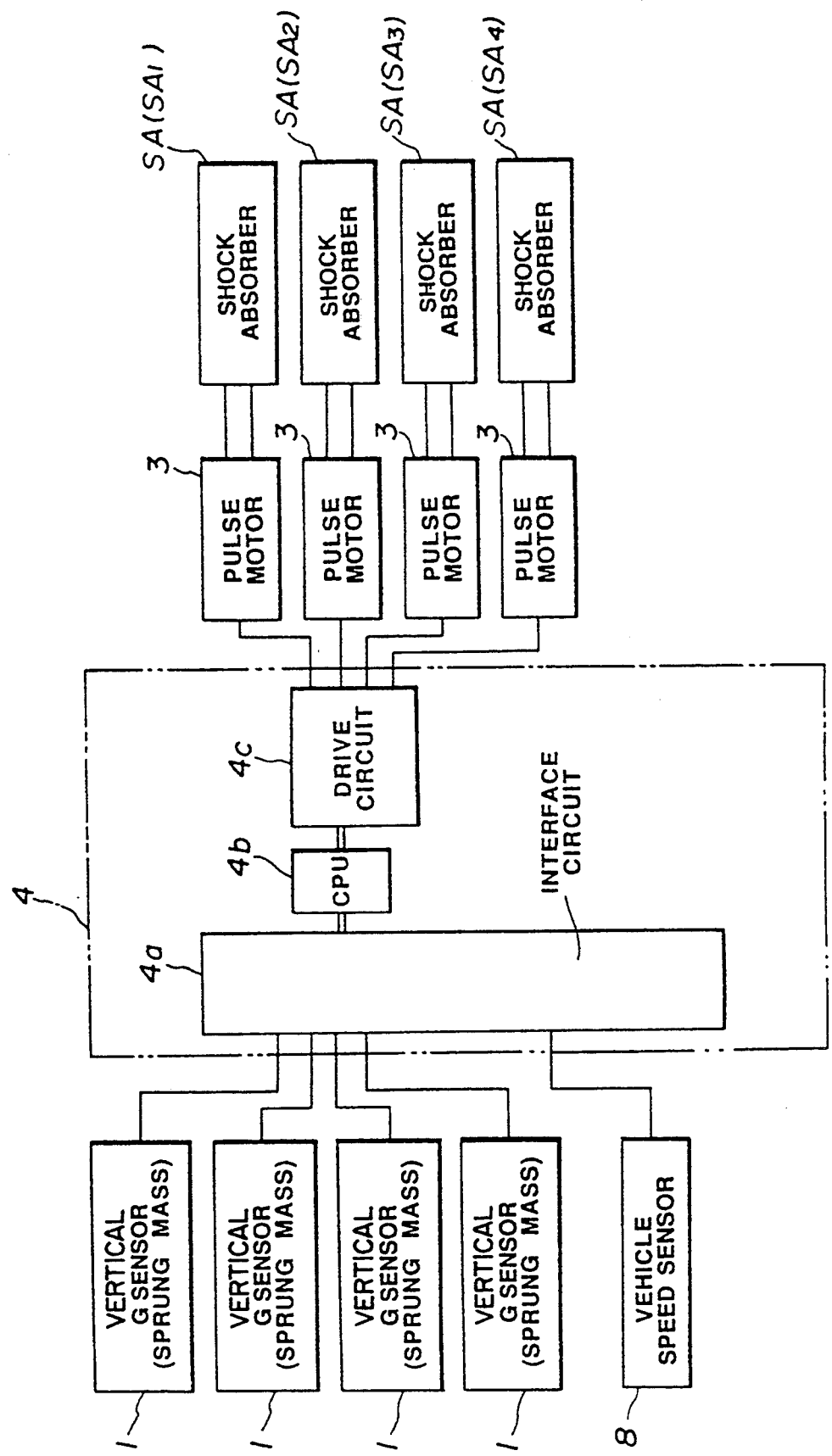
FIG. 25 is a circuit block diagram of the damping coefficient controlling apparatus in a sixth embodiment according to the present invention.
Figure 28A:
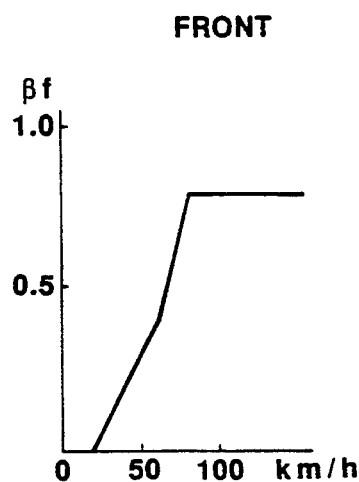
Figure 28B:
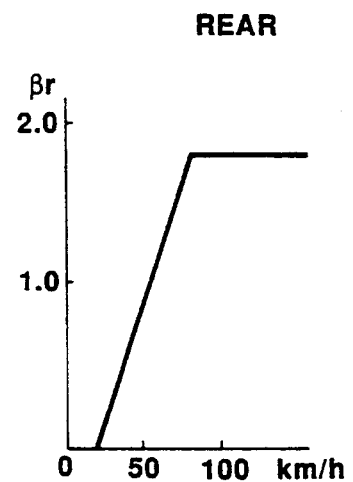
Figure 29A:
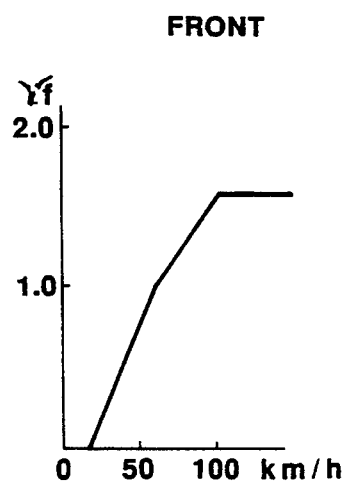
Figure 29B:
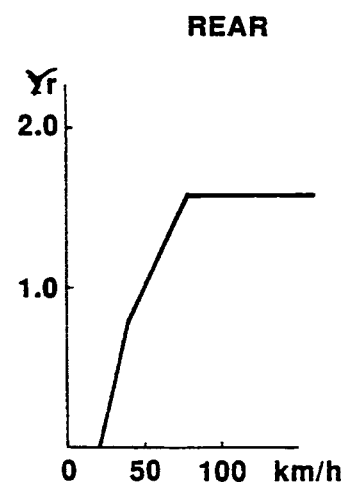

It is noted that, as shown in FIG. 25 of the sixth embodiment, the structure of the damping coefficient controlling apparatus is approximately the same as in the fourth embodiment shown in FIG. 19 except the steering angle sensor 2, brake sensor 5, fuel injection valve sensor 6A.

Then, the vehicle speed sensor 8 is connected to the interface circuit 4a.

FIG. 26 shows a control flowchart executed by the CPU 4b in the sixth embodiment.

In a step 101A, the CPU 4b reads the vertical G sensor values G from the vertical G sensors 1, 1, 1, and 1 and vehicle speed value VV from the vehicle speed sensor 8.

In a step 102A, the CPU 4b sets the bouncing coefficient $\alpha$, the pitch coefficient $\beta$, and rolling coefficient $\tau$ according to the vehicle speed VV.

Each subscript f and r attached to the respective coefficients $\alpha$, $\beta$, and $\tau$ is used for those of the front tire wheels and for those of the rear tire wheels.

As shown in FIGS. 27 (A) through 29 (B), the bouncing coefficient $\alpha_f$ and $\alpha_r$ indicate zero in a region of a low vehicle speed up to a predetermined speed.

In a region above the predetermined speed, the front tire wheel bouncing coefficient $\alpha_f$ is set as follows: $\alpha_f > \alpha_r$.

In a region above the predetermined speed, the front tire wheel pitching coefficient $\beta_f$ is set as follows: $\beta_f < \beta_r$.

In the region below the predetermined speed, both $\beta_f$ and $\beta_r$ are set to zeroes.

In the region above the predetermined speed, $\tau_f$, $\tau_r$ is set as follows:

$$\tau_f < \tau_r \text{ (provided that its difference is slight)}$$

In the region below the predetermined speed, both $\tau_f$ and $\tau_r$ indicate zeroes.

In a step 103A, the processing is the same as in the step 101 of FIG. 20.

In a step 104A, the processing is the same as in the step 102 of FIG. 14.

The equation calculated in the step 104A is the same as in the equation (1).

Figure 30A:
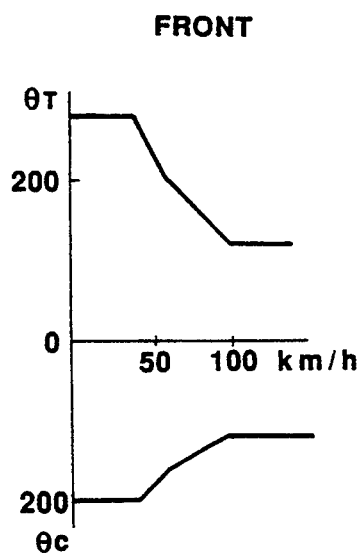
Figure 30B:
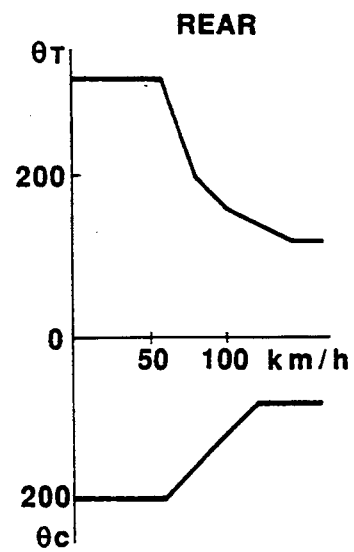
Figure 31:
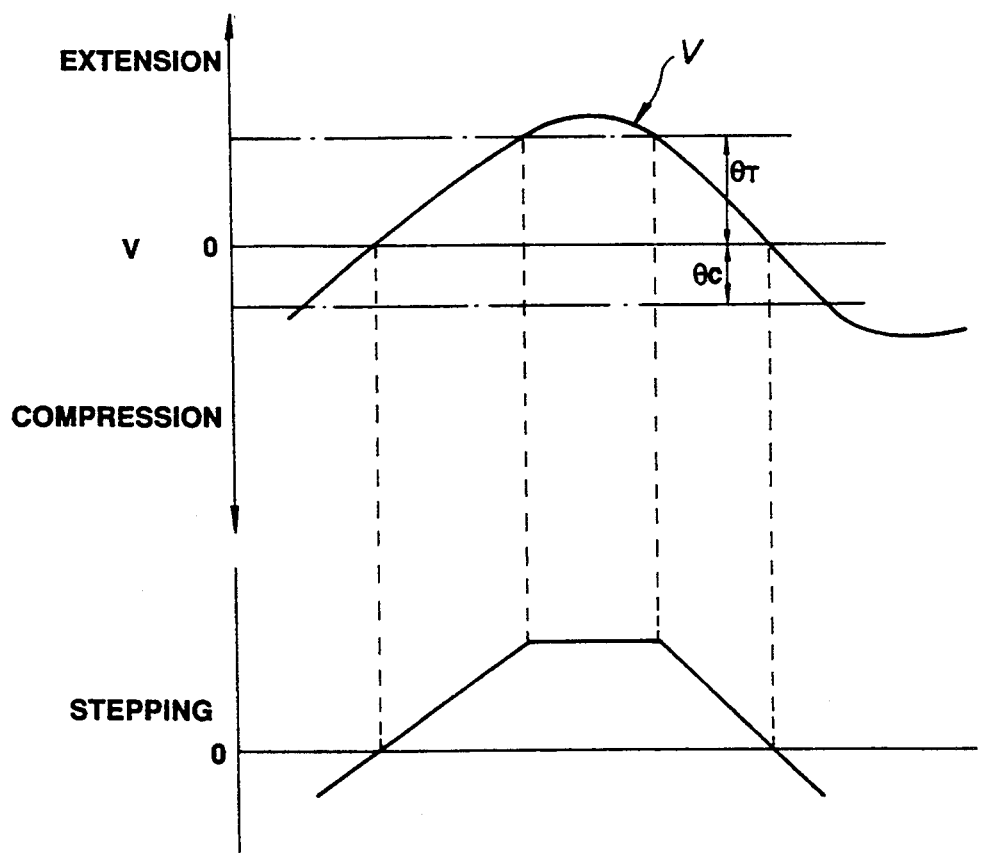
FIG. 31 is a characteristic graph of the control signal and stepping variation in the case of the sixth embodiment shown in FIG. 25.

In a step 105A, the CPU 4b sets a proportional range $\theta_T$ (extension stroke) and $\theta_C$ (compression stroke) in the control signal V on the basis of corresponding maps shown in FIGS. 30 (A) and 30 (B).

The extension stroke side proportional range $\theta_T$ is set such that those at the front tire wheel side are higher than those at the rear tire wheel side and the compression stroke proportional range $\theta_C$ is set such that those at the front tire wheel side are more speedily reduced as the vehicle speed becomes high and, in a case of the high vehicle speed region, those at the front tire wheel side are higher than those at the rear tire wheel side.

In a step 106A, the damping coefficient (actually, the drive stepping number of the pulse motor 3) is set on the basis of the control signal V.

The number of steppings of the pulse motor 3 are set from the equation (3A), $$\text{Target stepping number} = \text{MaxSTEP} \times \text{control signal } V/\text{proportional range } \theta. \quad (3A)$$

It is noted that MaxSTEP indicates the number of steppings at which the damping coefficient becomes maximum (in the case of the extension stroke, ① of FIG. 6). In addition, the proportional ranges $\theta_T$ and $\theta_C$ denote ranges to determine the number of steppings from the soft characteristic region SS to the maximum damping coefficient so as to make the control signal V proportional from zero up to any one of values of $\pm$.

If the proportional ranges $\theta_T$ and $\theta_C$ are widened, a change rate of the steppings of the pulse motor 3 from the soft characteristic (step 0) SS to the maximum damping coefficient is reduced so as to make it difficult to attain the maximum damping coefficient, thus the gain of the control signal V being reduced.

On the other hand, if the proportional ranges $\theta_T$ and $\theta_C$ are narrowed, the change rate of the steppings is enlarged from the soft characteristic SS of the pulse motor 3 up to the maximum damping coefficient so as to make it easy to attain the maximum damping coefficient.

Consequently, the gain of the control signal becomes large.

Figure 32:
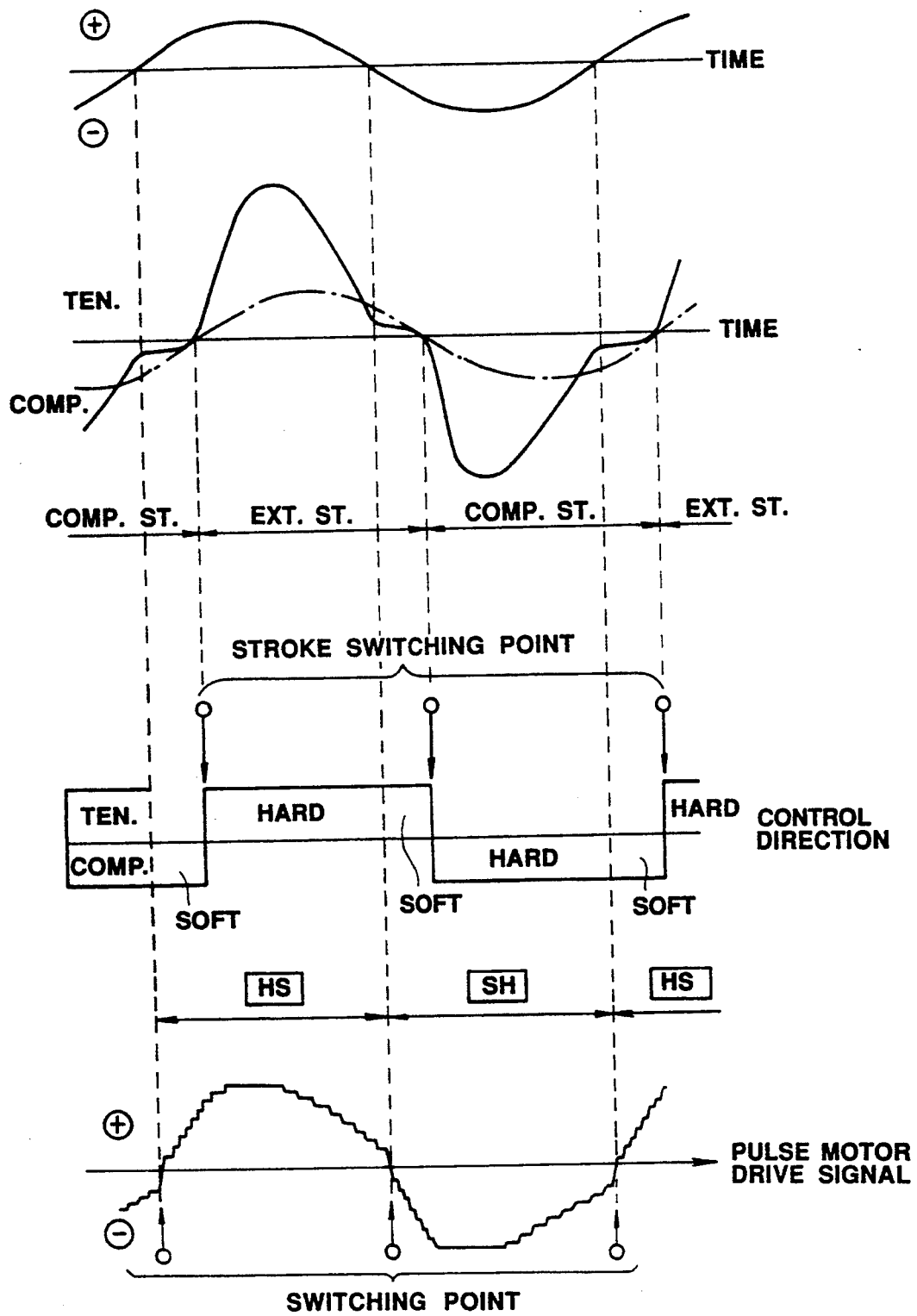
FIG. 32 is an integrally timing chart executed by the control unit in the sixth embodiment.

FIG. 32 is a timing chart of the damping coefficient controlling apparatus in the sixth embodiment.

In a case where the longitudinal sprung mass speed is changed as denoted by V of FIG. 32, the damping characteristic is alternatingly changed between the extension stroke side has region HS and compression stroke side hard characteristic SH. In this way, the damping coefficient is controlled.

The effects achieved in the sixth embodiment will be listed below.

a) Since the control of the damping coefficient is carried out against the pitching and rolling motions as well as the bouncing motion, the vehicular comfort and steering stability can be achieved.

b) Since only vertical G sensors are used, the structure of the damping coefficient controlling apparatus can be simplified.

c) Since the bouncing, pitching, and rolling coefficients $\alpha$, $\beta$, and $\tau$ are varied according to the vehicle speed, a maximum vibration suppression characteristic can be achieved for every vehicle speed. In addition, vehicular tuning freedom can be improved.

d) Since the proportional ranges $\theta$ are widened so as to correspond to the reduced vehicle speed VV and, therefore, the gain of the control signal V becomes large as the vehicle speed VV becomes low and becomes low as the vehicle speed VV becomes high, the maximum vibration damping force can more remarkably be achieved and freedom of tuning can more remarkably be improved.

e) Since the bouncing coefficient $\alpha$ and rolling coefficient $\tau$ are set such that $\alpha_f > \alpha_r$ and $\tau_f > \tau_r$, an understeer characteristic can be achieved and high steering stability can be achieved.

(Seventh Preferred Embodiment)

The structure of the seventh embodiment is the same as that in the sixth embodiment.

However, a part of the step 103A of control routine is different from the sixth preferred embodiment.

That is to say, the following equation (4A) is used to derive the control signal V.

FRONT, RIGHT TIRE WHEEL:

$$V_1 = \alpha_f v_1 + \beta_f(v'_1 - v'_3) + \tau_f(v''_1 - v''_2)$$

FRONT, LEFT TIRE WHEEL:

$$V_2 = \alpha_f v_2 + \beta_f(v'_2 - v'_4) + \tau_f(v''_2 - v''_1)$$

REAR, RIGHT TIRE WHEEL:

$$V_3 = \alpha_r v_3 + \beta_r(v'_3 - v'_1) + \tau_r(v''_3 - v''_4)$$

REAR, LEFT TIRE WHEEL:

$$V_4 = \alpha_r v_4 + \beta_r(v'_4 - v'_2) + \tau_r(v''_4 - v''_3) \quad (4A)$$

In the seventh embodiment, the bouncing signal component v is input only from the component corresponding to the position of the shock absorber SA.

The effects achievable in the seventh embodiment are the same as in the case of the fifth embodiment as compared with the fourth embodiment.

(Eighth Preferred Embodiment)

It is noted that the structure of an eighth preferred embodiment is approximately the same as that in the first embodiment shown in FIGS. 1 through 15.

However, the step of deriving the control signal for each shock absorber $SA_1$, $SA_2$, $SA_3$, and $SA_4$ is different as follows:

For one of the shock absorbers located at a front, right tire wheel;

$$V_{F1} = \alpha_f v_1 + \tau_r(v''_1 - v''_2)$$

For one of the other shock absorbers located at a front, left tire wheel;

$$V_{F2} = \alpha_f v_2 + \tau_r(v''_2 - v''_1)$$

For one of the other shock absorbers located at a rear, right tire wheel;

$$V_{R3} = \beta_r(v'_3 - v'_1) + \tau_r(v''_3 - v''_4)$$

For one of the other shock absorbers located at a rear, left tire wheel;

$$V_{R4} = \beta_r(v'_4 - v'_2) + \tau_r(v''_4 - v''_3).$$

In the eighth preferred embodiment, for the shock absorbers $SA_1$ and $SA_2$ located at the front tire wheel sides, the bouncing and rolling suppression control is carried out using the respective control signals $V_{F1}$ and $V_{F2}$ derived according to the bouncing component and rolling component. On the other hand, for the shock absorbers $SA_3$ and $SA_4$ located at the rear tire wheel sides, the pitching and rolling suppression control is carried out using the respective control signals $V_{R3}$ and $V_{R4}$ derived according to the pitching component and rolling component. Therefore, the control procedure can become simplified for the correspondence to all of the bouncing, pitching and rolling motions. In addition, an opportunity of abruptly changing the damping coefficient can become less and generation of oil impulse around the communication passages between the upper chamber and lower chamber can be suppressed.

A timing chart of the eighth embodiment is the same as the first embodiment shown in FIG. 15.

In details, when the control signal V falls in the intermediate range between the predetermined threshold values $\delta_T$, $-\delta_C$, the corresponding shock absorber SA is controlled toward the soft region SS.

When the control signal V is above the predetermined threshold value $\delta_T$, the corresponding shock absorber SA is controlled toward the extension hard region HS (the compression stroke side is fixed to the low damping coefficient and the damping coefficient at the extension stroke side is changed in proportion to the control signal V). At this time, the damping coefficient C is expressed as follows: $C = k \cdot V$.

When the control signal V is below the other predetermined threshold value $\delta_C$, the corresponding shock absorber SA is controlled toward the compression hard region SH (the extension stroke side is fixed to the low damping coefficient and the damping coefficient at the compression stroke side is controlled as $C = -k \cdot V$.

It is noted that, as an alternative of the eighth embodiment, the control signals $V_{F1}$ and $V_{F2}$ may be derived only according to the bouncing component $\alpha_f v_1$ and according to $\alpha_f v_2$, respectively, and the control signals $V_{R3}$ and $V_{R4}$ may be derived only according to either of the pitching component $\beta_r(v'_3 - v'_1)$ or rolling component $\tau_r(v''_3 - v''_4)$ and only according to either of the pitching component $\beta_r(v'_4 - v'_2)$ or rolling component $\tau_r(v''_4 - v''_3)$.

As described hereinabove, since, in the damping coefficient controlling apparatus according to the present invention, the control signal V is derived on the basis of at least one of the bouncing rate, pitching rate, and rolling rate and the damping coefficient is controlled on the basis of the control signal value, a sufficient control force can be achieved against the pitching and rolling motions. Therefore, the favorable vehicular comfort and steering stability can remarkably be improved.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An apparatus comprising:
   a) a plurality of shock absorbers, each of said shock absorbers being interposed between a portion of a vehicle body and corresponding road wheel and each having a piston member defining a fluid upper chamber and a fluid lower chamber and damping coefficient varying means associated with the piston member, said damping coefficient varying means operatively varying the damping coefficient in either stroke direction of the piston member to a target damping coefficient;
   a plurality of acceleration sensors, each associated with a shock absorber, each disposed on said vehicle body at a location proximate the associated shock absorber, and each arranged to produce an output signal indicative of a vertical acceleration;
   circuit means operatively connected with each of said plurality of acceleration sensors for receiving said output signals from said acceleration sensors, said circuit means including:
   sprung mass speed detecting means for filtering a sprung mass speed signal from each of said output signals;
   pitching rate detecting means for filtering a pitching rate component of the vehicle body from each of said sprung mass speed signals;
   rolling rate detecting means for filtering a rolling rate component of the vehicle body from each of said sprung mass speed signals; and
   controlling means for deriving a control signal for each of said damping coefficient varying means on the basis of at least one of the sprung mass speed signals, pitching rate components, and rolling rate components and outputting said control signal to the respective damping coefficient varying means of the corresponding shock absorbers.

2. An apparatus as set forth in claim 1, wherein said circuit means determines the pitching rate of the vehicle body from a difference between a pitching rate component for a forward end of the vehicle body with respect to a weight center of the vehicle body and a pitching rate component for a rearward end of the vehicle body with respect to the weight center of the vehicle body and wherein said circuit means determines the rolling rate of the vehicle body from a difference between a rolling rate component detected on a first of a left hand side and right hand side of the vehicle body with respect to the weight center of the vehicle body, and a rolling rate component detected on a second of the left hand side and the right hand side of the vehicle body with respect to the weight center of the vehicle body.

3. An apparatus for controlling each damping coefficient for vehicular shock absorbers as set forth in claim 1, which further includes means for detecting a relative speed between the vertical sprung mass speed and vertical unsprung mass speed, said relative speed detecting means being disposed on the portion of the vehicle body located adjacent to one of the shock absorbers, and wherein said controlling means determines whether a sign of the control signal Y is equal to that of the relative speed and outputs the control signal so that the target damping coefficient is a higher damping coefficient when both control signal V and relative speed indicate the mutually same signs and so that the target damping coefficient is set to a minimum damping coefficient when both control signal and relative speed have mutually different signs.

4. An apparatus for controlling each damping coefficient for vehicular shock absorbers as set forth in claim 3, wherein said relative speed detecting means includes a plurality of weight sensors located on the position of the vehicle body located adjacent to corresponding one of the shock absorbers.

5. An apparatus as set forth in claim 1, wherein said sprung mass speed detection means includes serially connected first and second low pass filters for each acceleration sensor, the second low pass filter integrating the signal from the first low pass filter, said pitching rate detecting means includes a first band pass filter for each acceleration sensor which passes a signal from said second low pass filter whose frequency falls in a first predetermined frequency range including a pitch resonance frequency of the vehicle body, and said rolling rate detecting means includes a second band pass filter for each acceleration sensor which passes a signal component whose frequency falls in a second predetermined frequency range including a rolling resonant frequency range.

6. An apparatus for controlling each damping coefficient for vehicular shock absorbers as set forth in claim 5 wherein said controlling means derives the control signal v as follows:

For one of the shock absorbers located at a front, right tire wheel;

$$V_{F1} = a f v_1 + r_f(v''_1 - v''_2)$$

For one of the other shock absorbers located at a front, left tire wheel;

$$V_{F2} = a f v_2 + r_f(v''_2 - v''_1)$$

For one of the other shock absorbers located at a rear, right tire wheel;

$$V_{R3} = B r (v'_3 + v'_1) + r(v''_3 - v''_4)$$

For one of the other shock absorbers located at a rear, left tire wheel;

$$V_{R4} = B r (v'_4 + v'_2) + r r(v''_4 - v''_3)$$

wherein a f, B, f and r f denote respective proportional constants on spring constants of the front tire wheels, on rolling rigidities thereof and on pitching rigidities thereof, a r, B r' and r r denote the respective proportional constants on spring constants of the rear tire wheels, on pitching rigidities thereof, and on the rolling rigidities thereof $v_1$, $v'_1$ and $v''_1$ denote vertical sprung mass speed signal derived from the front, right tire wheel vertical G sensor, $v_2$, $v'_2$ and $v''_2$ denote vertical sprung mass speed signal derived from the front, left tire wheel vertical G sensor, and $v_3$, $v'_3$ and $v''_3$ denote vertical sprung mass speed signal derived from the rear, right tire wheel vertical G sensor, and $v_4$, $v'_4$ and $v''_4$ denote vertical sprung mass speed signal derived from the rear, left tire wheel vertical G sensor.

7. An apparatus as set forth in claim 5, wherein said plurality of shock absorbers includes:
a first shock absorber disposed at a front right hand portion of the vehicle body and associated with a front right hand road wheel,
a second shock absorber disposed at a front left hand portion of the vehicle body and associated with a front left hand road wheel,
a third shock absorber disposed at a rear right hand portion of the vehicle body and associated with a rear right hand road wheel, and
a fourth shock absorber disposed at a rear left hand portion of the vehicle body and associated with a rear left hand road wheel, and
wherein said controlling means derives control signals $V_1$, $V_2$, $V_3$, and $V_4$ respectively for each of said first to fourth shock absorbers as follows:

$$V_1 = a_f/4 (v_1+v_2+v_3+v_4) + \beta_f(v'_1-v'_3) + \tau_f(v''_1-v''_2)$$

$$V_2 = a_f/4 (v_1+v_2+v_3+v_4) + \beta_f(v'_2-v'_4) + \tau_f(v''_2-v''_1)$$

$$V_3 = a_r/4 (v_1+v_2+v_3+v_4) + \beta_r(v'_3-v'_1) + \tau_r(v''_3-v''_4)$$

$$V_4 = a_r/4 (v_1+v_2+v_3+v_4) + \beta_r(v'_4-v'_2) + \tau_r(v''_4-v''_3)$$

wherein:
$a_f$, $\beta_f$, and $\tau_f$ respectively denote proportional constants which are dependent on spring constants of the front road wheels, on rolling rigidities of said front road wheels, and on pitching rigidities of said front road wheels,
$a_r$, $\beta_r$, and $\tau_r$ denote the respective proportional constants which are dependent on spring constants of the rear road wheels, on pitching rigidities of the rear road wheels, and on the rolling rigidities of said rear road wheels,
$v_1$, $v'_1$ and $v''_1$ denote values which are derived from the sprung mass speed signal derived from the output signal from the acceleration sensor associated with the front, right road wheel,
$v_2$, $v'_2$ and $v''_2$ denote values which are derived from the sprung mass speed signal derived from output signal from the acceleration sensor associated with the front, left road wheel, v₃, v'₃ and v"₃ denote values which are derived from the sprung mass speed signal derived from the output signal from the acceleration sensor associated with the rear, right road wheel, and v₄, v'₄ and v"₄ denote values which are derived from the sprung mass speed signal derived from the output signal from the acceleration sensor associated with the rear, left road wheel.

8. An apparatus as set forth in claim 7, wherein each shock absorber is so constructed and arranged as to provide three controllable ranges:

a first extension stroke side hard region in which the extension stroke provides the variable damping coefficient and the compression stroke is fixed to a first predetermined low damping coefficient;

a second compression stroke side hard region in which the compression stroke provides the variable damping coefficient and extension stroke is fixed to a second predetermined low damping coefficient; and a soft region in which both extension and compression strokes respectively provide the first and second predetermined low damping coefficients.

9. An apparatus as set forth in claim 8, wherein said controlling means determines whether each of the derived control signals ($V_1$, $V_2$, $V_3$, and $V_4$) is above a predetermined positive threshold value or negatively below a negative predetermined threshold value $\pm\delta_T$, or falls in a range from the positive threshold value $+\delta_T$ to the negative threshold value $-\delta_C$, and wherein said controlling means outputs the control signal to said damping coefficient varying means of the corresponding shock absorber so as to provide the first extension hard region when the corresponding control signal V is above the positive predetermined threshold value $+\delta_T$, so as to provide the second compression hard region when the corresponding control signal V is below the negative predetermined threshold value $-\delta_C$, and so as to provide the soft region when the corresponding control signal V falls in the range between the positive and negative predetermined threshold values $+\delta_T$ and $-\delta_C$.

10. An apparatus as set forth in claim 9, wherein when said controlling means compares each of said control signals $V_1$, $V_2$, $V_3$, and $V_4$, with said positive predetermined threshold value and said negative predetermined threshold valve, and wherein said controlling means derives the control signals $V_1$, $V_2$, $V_3$, and $V_4$ respectively for each of said first to fourth shock absorbers as follows:

$$V_1 = \alpha_f v_1 + \beta_f(v'_1 - v'_3) + f(v''_1 - v''_2)$$

$$V_2 = \alpha_f v_1 + \beta_f(v'_2 - v'_4) + \tau_f(v''_2 - v''_1)$$

$$V_3 = \alpha_r v_1 + \beta_r(v'_3 - v'_1) + \tau_r(v''_3 - v''_4)$$

$$V_4 = \alpha_r V_4 + \beta_r(v'_4 - v'_2) + \tau_r(v''_4 - v''_3)$$

11. An apparatus as set forth in claim 10, which further includes a vehicle speed sensor for detecting a vehicle speed and wherein said controlling means includes coefficient varying means for varying said $\alpha_f$, $\beta_f$, $\tau_f$, $\alpha_r$, $\beta_r$, and $\tau_r$ in accordance with the vehicle speed detected by said vehicle speed sensor.

12. An apparatus as set forth in claim 9, which further includes:

abrupt vehicle acceleration/deceleration detecting means for detecting one of an abrupt acceleration and an abrupt deceleration of the vehicle; and vehicular steering condition detecting means for detecting a steering condition of the vehicle; and wherein said controlling means is responsive to said abrupt vehicle acceleration/deceleration detecting means and said vehicle steering condition detecting means, and includes:

pitching rate correction means for amplifying said pitching rate component when the vehicle is detected as being in the abrupt acceleration/deceleration state, and rolling rate correction means for amplifying said rolling rate component when the vehicle is detected as being in a predetermined steering condition.

13. An apparatus as set forth in claim 12, wherein when said apparatus includes said abrupt acceleration/deceleration detecting means and said vehicle steering condition detecting means said controlling means derives the control signals as follows:

$$V_1 = \alpha_f/4$$
$$(v_1 + v_2 + v_3 + v_4) + \beta_f m_f(v'_1 - v'_3) + \tau_f K_f(v''_1 - v''_2)$$

$$V_2 = \alpha_f/4$$
$$(v_1 + v_2 + v_3 + v_4) + \beta_f m_f(v'_2 - v'_4) + \tau_f K_f(v''_2 - v''_1)$$

$$V_3 = \alpha_r/4$$
$$(v_1 + v_2 + v_3 + v_4) + \beta_r m_r(v'_3 - v'_1) + \tau_r K_r(v''_3 - v''_4)$$

$$V_4 = \alpha_r/4$$
$$(v_1 + v_2 + v_3 + v_4) + \beta_r m_r(v'_4 - v'_2) + \tau_r K_r(v''_4 - v''_3)$$

wherein:

$\alpha_f$, $\beta_f$ respectively denote proportional constants which are dependent on spring constants of the front road wheels, on rolling rigidities of said front road wheels, and on pitching rigidities of said front road wheels, $\alpha_r'$, $\beta_r'$ and $\tau_r$ respectively denote proportional constants which are dependent on spring constants of the rear road wheels, on pitching rigidities of said rear road wheels, and on the rolling rigidities of said rear road wheels, and $m_f(>1.0)$, $K_f(>1.0)$ $m_r(>1.0)$ and $K_r(>1.0)$ denote amplification factors for $\alpha_f$, $\beta_{ff}$, $\alpha_r$, $\beta_r$, $\tau_r$.

14. An apparatus as set forth in claim 13, wherein said abrupt acceleration/deceleration detecting means includes:

a brake sensor for detecting a vehicle brake being applied, and a fuel injection pulsewidth sensor for detecting a pulsewidth of a drive signal supplied to a fuel injection valve of an engine associated with said vehicle body, and wherein:

said vehicular steering condition sensor means includes a steering sensor for detecting a steering angle and a steering angular velocity indicative of the rate at which the steering angle changes.

15. An apparatus as set forth in claim 14, wherein said predetermined steering condition is determined in response to both the steering angle and the steering angular velocity being above a predetermined threshold value.

16. An apparatus as set forth in claim 7, which further includes a vehicle speed sensor for detecting a vehicle speed and wherein said controlling means includes coefficient varying means for varying said $\alpha_f$, $\beta_f$, $\tau_f$, $\alpha_r$, $\beta_r$, and $\tau_r$ in accordance with the vehicle speed detected by said vehicle speed sensor.

17. An apparatus as set forth in claim 16, wherein said controlling means further includes control signal gain varying means for varying a gain of the control signals according to the vehicle speed detected said vehicle speed sensor.

18. An apparatus as set forth in claim 17, wherein said $\alpha_f$ and $\alpha_r$ are varied such that when the vehicle speed falls in a first predetermined low speed range from zero to a first predetermined speed range limit, both $\alpha_f$ and $\alpha_r$ are set to zeroes and when the vehicle speed falls in a range above the first predetermined speed limit, $\alpha_f > \alpha_r$, said $\beta_f$ and $\beta_r$ are varied such that when the vehicle speed falls in a second predetermined low speed range from zero to a second predetermined speed range limit, both $\beta_f$ and $\beta_r$ are set to zeroes and when the vehicle speed falls in a range above the second predetermined speed limit, $\beta_f < \beta_r$, and said $\tau_f$ and $\tau_r$ are varied such that when the vehicle speed falls in a third predetermined low speed range from zero to a third predetermined speed range limit, both $\tau_f$ and $\tau_r$ are set to zeroes and when the vehicle speed falls in a range above the third predetermined speed limit, $\tau_f < \tau_r$.

19. An apparatus as set forth in claim 18, wherein the gain of the control signals is increased as the vehicle speed is increased.

20. An apparatus as set forth in claim 5, wherein said controlling means derives the control signal V as follows:

$$V_{F1} = \alpha_f V_1 + \tau_f(v''_1 - v''_2)$$

$$V_{F2} = \alpha_f V_2 + \tau_r(v''_2 - v''_1)$$

$$V_{R3} = \beta_r(v'_3 + v'_1) + \tau_r(v''_3 - v''_4)$$

$$V_{R4} = \beta_r(v'_4 + v'_2) + \tau_r(v''_4 - v''_3)$$

wherein $\alpha_f$, $\beta_f$ and $\tau_f$ respectively denote proportional constants which are dependent on spring constants of the front road wheels, on rolling rigidities of the front road wheels, and on pitching rigidities of said front road wheels, $\alpha_r$, $\beta_r$ and $\tau_r$ denote the respective proportional constants which are dependent on spring constants of the rear road wheels, on pitching rigidities on the rear road wheels, and on the rolling rigidities of said rear road wheels, $v_1$, $v'_1$, and $v''_1$ denote values which are derived from the sprung mass speed signal derived from the output signal from the acceleration sensor associated with the front, right road wheel, $v_2$, $v'_2$, $v''_2$ denote values which are derived from the sprung mass speed signal derived from the output signal from the acceleration sensor associated with the front, left road wheel, and $v_3$ $v'_3$ and $v''_3$ denote values which are derived from the sprung mass speed signal derived from the output signal from the acceleration sensor associated with the rear, right road wheel, and $v_4$, $v'_4$, and $v''_4$ denote values which are derived for the sprung mass speed signal derived from the output signal from the acceleration sensor associated with the rear, left road wheel.

21. An apparatus as set forth in claim 1, which further includes a plurality of relative speed detecting means, each of said relative speed detecting means being arranged to detect a relative speed between the vehicle body and each of said road wheels, and wherein said controlling means determines whether a sign of a control signal V which is supplied to a damping coefficient varying means is the same as that of the relative speed between said vehicle body and the road wheel which is associated with the shock absorber in which the damping coefficient varying means is disposed, and modifies the control signal so that the target damping coefficient is set to a high damping coefficient when the sign of the control signal V and the sign of the relative speed have a first predetermined relationship with one another, and so that the target damping coefficient is set to a minimum damping coefficient when the sign of the control signal and the sign of the relative speed have a second predetermined relationship with one another.

22. An apparatus as set forth in claim 21, wherein said each of said relative speed detecting means comprises a weight sensor which is located on the vehicle body adjacent to a corresponding one of the shock absorbers and which is operatively associated with a road wheel.

23. An apparatus for controlling each damping coefficient for vehicular shock absorbers comprising:
a) a plurality of shock absorbers, each interposed between a portion of a vehicular body and corresponding tire wheel and each having a piston member defining a fluid upper chamber and a fluid lower chamber and damping coefficient varying means associated with the piston member, said damping coefficient varying means operatively varying its position in response to a control signal so that the damping coefficient at either stroke side of the chambers defined by the piston member is set to a target damping coefficient;
b) vertical sprung mass speed detecting means for detecting a vertical sprung mass speed of an adjacent position of the vehicular body on which each shock absorber is placed;
c) pitching rate detecting means for detecting a pitching rate of the vehicle body;
d) rolling rate detecting means for detecting a rolling rate of the vehicle body; and
e) controlling means for deriving the control signal for each shock absorber on the basis of at least any one of the vertical sprung mass speed, pitching rate, and rolling rate determined according to a position of each shock absorber located at a corresponding tire wheel and outputting the control signal to each damping coefficient varying means of the corresponding shock absorbers so to provide the target damping coefficient therein;
wherein said pitching rate detecting means detects the pitching rate of the vehicle body from a difference between the vertical sprung mass speeds of a forward vehicle body and rearward vehicle body with a weight center of the vehicle body as a center on the basis of the detected vertical sprung mass speeds of the vertical sprung mass speed detecting means and said rolling rate detecting means detects the rolling rate of the vehicle body from a difference between the vertical sprung mass speeds of rightward vehicle body and leftward vehicle body with the weight center of the vehicle body as the center on the basis of the detected vertical sprung mass speeds of the vertical sprung mass speed detecting means;

wherein said vertical sprung mass speed detecting means includes a plurality of vertical G sensors, each located on the vehicle body adjacent to the corresponding shock absorber;

wherein said vertical sprung mass speed detecting means includes a first band pass filter for each vertical G sensor which passes a signal component whose frequency falls in a first predetermined frequency range including a sprung mass resonance frequency at one of the front and rear tire wheels, said pitching rate detecting means includes a second band pass filter for each vertical G sensor which passes a signal component whose frequency falls in a second predetermined frequency range including a pitch resonance frequency of the vehicle body, and said rolling rate detecting means includes a third band pass filter for each vertical G sensor which passes a signal component whose frequency falls in a third predetermined frequency range including a rolling resonant frequency range;

wherein said controlling means derives the control signal V as follows:

For one of the shock absorbers located at a front, right tire wheel;

$$V_1 = \alpha_f/4\ (v_1+v_2+v_3+v_4)+\beta_f(v'_1-v'_3)+\tau_f(v''_1-v''_2)$$

For one of the other shock absorbers located at a front, left tire wheel;

$$V_2=\alpha_f/4\ (v_1+v_2+v_3+v_4)+\beta_f(v'_2-v'_4)+\tau_f(v''_2-v''_1)$$

For one of the other shock absorbers located at a rear, right tire wheel;

$$V_3=\alpha_r/4\ (v_1+v_2+v_3+v_4)+\beta_r(v'_3-v'_1)+\tau_r(v''_3-v''_4)$$

For one of the other shock absorbers located at a rear, left tire wheel;

$$V_4=\alpha_r/4\ (v_1+v_2+v_3+v_4)+\beta_r(v'_4-v'_2)+\tau_r(v''_4-v''_3)$$

wherein $\alpha_f$, $\beta_f$, and $\tau_f$ denote respective proportional constants on spring constants of the front tire wheels, on rolling rigidities thereof, and on pitching rigidities thereof, $\alpha_r$, $\beta_r$, and $\tau_r$ denote the respective proportional constants on spring constants of the rear tire wheels, on pitching rigidities thereof, and on the rolling rigidities thereof, $v_1$, $v'_1$ and $v''_1$ denote vertical sprung mass speed signal derived from the front, right tire wheel vertical G sensor, $v_2$, $v'_2$ and $v''_2$ denote vertical sprung mass speed signal derived from the front, left tire wheel vertical G sensor, and $v_3$, $v'_3$ and $v''_3$ denote vertical sprung mass speed signal derived from the rear, right tire wheel vertical G sensor, and $v_4$, $v'_4$ and $v''_4$ denote vertical sprung mass speed signal derived from the rear, left tire wheel vertical G sensor.

24. An apparatus for controlling each damping coefficient for vehicular shock absorbers as set forth in claim 23, wherein each shock absorber is formed with three controllable ranges: a first extension stroke side hard region in which the extension stroke side provides the variable damping coefficient and the compression stroke side is fixed to a predetermined low damping coefficient; a second compression stroke side hard region in which the compression stroke side provides the variable damping coefficient and extension stroke side is fixed to another predetermined low damping coefficient side; and a soft region in which both extension and compression stroke sides provide the predetermined low damping coefficients.

25. An apparatus for controlling each damping coefficient for vehicular shock absorbers as set forth in claim 24, wherein said controlling means determines whether the derived control signal ($V_1$, $V_2$, $V_3$, and $V_4$) is above a plus predetermined threshold value $\delta_T$, negatively below a minus predetermined threshold value $-\delta_C$, or falls in a range from the plus threshold value $\delta_T$ to the minus threshold value $-\delta_C$ and wherein said controlling means outputs the control signal to said damping coefficient varying means of the corresponding shock absorber so as to provide the first extension hard region when the corresponding control signal V is above the plus predetermined threshold value $+\delta_T$, so as to provide the second compression hard region when the corresponding control signal V is below the minus predetermined threshold value $-\delta_C$, and so as to provide the soft region when the corresponding control signal V falls in the range between the plus and minus predetermined threshold values $+\delta_T$ and $-\delta_C$.

26. An apparatus for controlling each damping coefficient for vehicular shock absorbers as set forth in claim 25, wherein said controlling means derives the control signal as follows:

For one of the shock absorbers located at a front, right tire wheel;

$$V_1=a\,f\,v_1+B\,f(v'_1-v'_3)+f(v''_1-v''_2)$$

For one of the other shock absorbers located at a front, left tire wheel;

$$V_2=a\,f_2+B\,f(v'_2-v'_4)+r\,f(v''_2-v''_1)$$

For one of the other shock absorbers located at a rear, right tire wheel;

$$V_3=a\ r'_3+B\ r(v'_3-v'_1)+r\ r(v''_3-v''_4)$$

For one of the other shock absorbers located at a rear, left tire wheel;

$$V_4=a\ r'_4+B\ r(v'_4-v'_2)+r\ r(v''_4-v''_3),$$

wherein a f, B f, and f denote respective proportional constants on spring constants of the front tire wheels, on rolling rigidities thereof, and on pitching rigidities thereof, a a r, B r, and r denote the respective proportional constants on spring constants of the rear tire wheels, on pitching rigidities thereof, and on the rolling rigidities thereof, $v_1$, $v'_1$, and $v''_1$ denote vertical sprung mass speed signal derived from the front, right tire wheel vertical G sensor, $v_2$, $v'_2$, $v''_2$ denote vertical sprung mass speed signal derived from the front, left tire wheel vertical G sensor, and $v_3$, $v'_3$, and $v''_3$ denote vertical sprung mass speed signal derived from the rear, right tire wheel vertical G sensor, and v₄, v'₄, and v''₄ denote vertical sprung mass speed signal derived from the rear, left tire wheel vertical G sensor.

27. An apparatus for controlling each damping coefficient for vehicular shock absorbers as set forth in claim 26, which further includes a vehicle speed sensor for detecting a vehicle speed and wherein said controlling means includes a coefficient varying block which varies said $\alpha_f$, $\beta_f$, $\tau_f$, $\alpha_r$, $\beta_r$, and $\tau_r$ according to the vehicle speed.

28. An apparatus for controlling each damping coefficient for vehicular shock absorbers as set forth in claim 25, which further includes abrupt acceleration/deceleration detecting means for detecting an abrupt acceleration and/or deceleration of the vehicle and vehicular steering condition detecting means for detecting a steered condition of the vehicle and wherein said controlling means includes a pitching rate correction block for amplifying the pitching rate when the vehicle is in the abrupt acceleration/deceleration state and a rolling rate correction block for amplifying the rolling rate when the vehicle is in a predetermined steering condition.

29. An apparatus for controlling each damping coefficient for vehicular shock absorbers as set forth in claim 28, wherein said controlling means derives the control signal as follows:

For one of the shock absorbers located at a front, right tire wheel;

$$V_1 = a_f/4 (v_1+v_2+v_3+v_4) + B_f m_f(v'_1-v'_3) + f K_f(v''_1-v''_2)$$

For one of the other shock absorbers located at a front, left tire wheel;

$$V_2 = a_f/4 (v_1+v_2+v_3+v_4) + B_f m_f(v'_2-v'_4) + f K_f(v''_2-v''_1)$$

For one of the other shock absorbers located at a rear, right tire wheel;

$$V_3 = a_r/4 (v_1+v_2+v_3+v_4) + B_r m_r(v'_3-v'_1) + r K_r(v''_3-v''_4)$$

For one of the other shock absorbers located at a rear, left tire wheel;

$$V_4 = a_r/4 (v_1+v_2+v_3+v_4) + B_r m_r(v'_4-v'_2) + r K_r(v''_4-v''_3)$$

wherein a f, B f and r f denote respective proportional constants on spring constants of the front tire wheels, on rolling rigidities thereof, and on pitching rigidities thereof, a r' B r' and r r denote the respective proportional constants on spring constants of the rear tire wheels, on pitching rigidities thereof, and on the rolling rigidities thereof, $m_f$ (>1.0), $K_f$(>1.0) $m_r$(>1.0) and $K_r$(>1.0) denote amplification factors for a f, B f, f, a r, B r, rr, $v_1$, $v'_1$, and $v''_1$ denote vertical sprung mass speed signal derived from the front, right tire wheel vertical G sensor, $v_2$, $v'_2$, $v''_2$ denote vertical sprung mass speed signal derived from the front, left tire wheel vertical G sensor, and $v_3$ $v'_3$ and $v''_3$ denote vertical sprung mass speed signal derived from the rear, right tire wheel vertical G sensor, and $v'_4$, and $v''_4$ denote vertical sprung mass speed signal derived from the rear, left tire wheel vertical G sensor.

30. An apparatus for controlling each damping coefficient for vehicular shock absorbers as set forth in claim 29, wherein said abrupt acceleration/deceleration detecting means includes a brake sensor for detecting whether a brake switch is turned on and a fuel injection pulsewidth sensor for detecting a pulsewidth of a drive signal supplied to one of fuel injection valves disposed in a vehicular engine and wherein said steering condition sensor includes a steering sensor for detecting a steering angle and steering angular velocity.

31. An apparatus for controlling each damping coefficient for vehicular shock absorbers as set forth in claim 30, wherein said predetermined steered condition is determined depending on whether both steering angle $\theta$ and steering angular velocity $\omega$ are above one threshold value b.

32. An apparatus for controlling each damping coefficient for vehicular shock absorbers as set forth in claim 28, wherein said controlling means derives the control signal as follows:

For one of the shock absorbers located at a front, right tire wheel;

$$V_1 = a_f(v_1 + B f^m f(v'_1-v'_3) + r f K_f(v''_1-v''_2)$$

For one of the other shock absorbers located at a front, left tire wheel;

$$V_2 a_f v_1 + B f^m f(v'_2-v'_4) + r f K_f(v''_2-v''_1)$$

For one of the other shock absorbers located at a rear, right tire wheel;

For one of the other shock absorbers located at a rear, left tire wheel;

$$V_4 = a\ r\ v_4 + B\ r\ m\ r\ (V'_4-v'_2) + r K\ r(v''_4-v''_3)$$

wherein a f, B f and r f denote respective proportional constants on spring constants of the front tire wheels, on rolling rigidities thereof, and on pitching rigidities thereof, a r, B r' and r r denote the respective proportional constants on spring constants of the rear tire wheels, on pitching rigidities thereof, and on the rolling rigidities thereof, $m_f$ (>1.0), $K_f$(>1.0) $m_r$(>1.0) and $K_r$(>1.0) denote amplification factors for a f, B f, f, a r, B r, rr, $v_1$, $v'_1$, and $v''_1$ denote vertical sprung mass speed signal derived from the front right tire wheel vertical G sensor, $v_2$, $v'_2$, $v''_2$ denote vertical sprung mass speed signal derived from the front, left tire wheel vertical G sensor and $v_3$, $v'_3$, $v''_3$ denote vertical sprung mass speed signal derived from the rear, right tire wheel vertical G sensor, and v₄, v'₄, v''₄ denote vertical sprung mass speed signal derived from the rear, left tire wheel vertical G sensor.

33. An apparatus for controlling each damping coefficient for vehicular shock absorbers as set forth in claim 23, which further includes a vehicle speed sensor for detecting a vehicle speed and wherein said controlling means includes a coefficient varying block which varies said $\alpha_f$, $\beta_f$, $\tau_f$, $\alpha_r$, $\beta_r$, and $\tau_r$ according to the vehicle speed.

34. An apparatus for controlling each damping coefficient for vehicular shock absorbers as set forth in claim 33, wherein said controlling means further includes a control signal gain varying block which varies a gain of the control signal V according to the vehicle speed.

35. An apparatus for controlling each damping coefficient for vehicular shock absorbers as set forth in claim 34, wherein said $\alpha_f$ and $\alpha_r$ are varied such that when the vehicle speed falls in a first predetermined low speed range from zero to a first predetermined speed range limit, both $\alpha_f$ and $\alpha_r$ are zeroes and when the vehicle speed falls in a range above the first predetermined speed limit, $\alpha_f > \alpha_r$, said $\beta_f$ and $\beta_r$ are varied such that when the vehicle speed falls in a second predetermined low speed range from zero to a second predetermined speed range limit, both $\beta_f$ and $\beta_r$ are zeroes and when the vehicle speed falls in a range above the second predetermined speed limit, $\beta_f < \beta_r$, and said $\tau_f$ and $\tau_r$ are varied such that when the vehicle speed falls in a third predetermined low speed range from zero to a third predetermined speed range limit, both $\tau_f$ and $\tau_r$ are zeroes and when the vehicle speed falls in a range above the third predetermined speed limit, $\tau_f < \tau_r$.

36. An apparatus for controlling each damping coefficient for vehicular shock absorbers as set forth in claim 35, wherein the gain of the control signal is increased as the vehicle speed is increased.

37. An apparatus comprising:
a plurality of shock absorbers, each interposed between a portion of a vehicular body and a corresponding road wheel, each of said shock absorbers having a piston member and a damping coefficient varying means associated with the piston member, said damping coefficient varying means operatively varying the damping coefficient in either stroke direction of the piston member to a target damping coefficient;
a plurality of acceleration sensors, each associated with a shock absorber, each disposed on said vehicle body at a location proximate the associated shock absorber, and each arranged to produce an output signal indicative of a vertical acceleration;
circuit means operatively connected with each of said plurality of acceleration sensors for receiving the output signals from said acceleration sensors, said circuit means including:
filter means for filtering a sprung mass speed from each of the output signals from said plurality of acceleration sensors and producing a plurality of sprung mass speed signals;
bouncing component detecting means for deriving a bouncing component from each of said plurality of sprung mass speed signals;
pitching component detecting means for deriving a pitching component from each of said plurality of sprung mass speed signals;
rolling component detecting means for deriving a rolling component for each of said plurality of sprung mass speed signals; and
e) controlling means for:
deriving and outputting a control signal to each damping coefficient varying means of the shock absorbers associated with road wheels located at a forward end of said vehicle body at least on the basis of the derived bouncing components, and
deriving and outputting a control signal to each damping coefficient varying means of the shock absorbers associated with road wheel located at a rear end of said vehicle body on the basis of at least one of the derived pitching component and rolling component outputting the control signals to the respective damping coefficient varying means.

38. An apparatus for controlling a plurality of shock absorbers, each of said shock absorbers being interposed between a portion of a vehicular body and corresponding road wheel, comprising:
a plurality of damping coefficient varying means, each of said damping coefficient means being associated with one of said shock absorbers and responsive to a control signal, for varying a damping coefficient of the shock absorber to a target damping coefficient;
a plurality of acceleration sensors each disposed on said vehicular body at a location proximate a shock absorber, each of said acceleration sensors producing an output signal indicative of a sensed acceleration;
circuit means associated said plurality of acceleration sensors, said circuit means including filtering means for filtering each of the output signals from said plurality of acceleration sensors and for deriving a bounce signal component, a pitch signal component, and a roll signal component for each of said output signals; and
control means, responsive to said circuit means, for deriving and outputting a control signal to each of said damping coefficient varying means on the basis of at least one of said bounce signal component, pitch signal component, and roll signal component derived for each of said input signals.

39. An apparatus comprising:
a shock absorber, said shock absorber being operatively connected between a vehicle body and a vehicle road wheel;
damping coefficient varying means incorporated into said shock absorber for controlling the damping coefficient of said shock absorber during both compression and contraction modes of said shock absorber;
an acceleration sensor mounted on said vehicle body proximate location where said shock absorber is connected with said vehicle body;
first filtering means for extracting a sprung mass speed signal from the output of said acceleration sensor;
second filtering means for filtering said sprung mass speed signal so as to derive:
a bounce rate component,
a pitch rate component, and
a rolling rate component; and
control means for deriving a control signal on the basis of at least one of said bounce rate component, pitch rate component and rolling rate component.

40. An apparatus as set forth in claim 39, further comprising relative velocity determining means for determining the relative velocity between said vehicle body and said road wheel, said control means being responsive to the velocity determining means for modifying said control signal in accordance with the direction and magnitude of the detected relative velocity.

41. An apparatus as set forth in claim 39, further comprising a vehicle speed detecting means for detecting the vehicle speed, said control means being responsive to said vehicle speed detecting means for modifying said control signal in accordance with the detected vehicle speed.

42. An apparatus as set forth in claim 39, further comprising means responsive to the application of a vehicular brake for producing a signal indicative of sudden deceleration, said control means being responsive to the sudden deceleration indicative signal for modifying said control signal.

43. An apparatus as set forth in claim 39, further comprising means responsive to a demand for vehicle acceleration for producing a signal indicative of vehicle acceleration, said control means being responsive to the vehicle acceleration indicative signal for modifying said control signal.

* * * * *